United States Patent
Hoffman et al.

(10) Patent No.: US 10,959,547 B2
(45) Date of Patent: Mar. 30, 2021

(54) FOLDING FLAP HANGER DEVICE HAVING MULTIPLE PEEL FRONTS

(71) Applicant: 3M INNOVATIVE PROPERTIES COMPANY, St. Paul, MN (US)

(72) Inventors: Joseph A. Hoffman, Minneapolis, MN (US); Angela L. Pan, Arden Hills, MN (US); Craig D. Thompson, Inver Grove Heights, MN (US); Chaodi Li, Woodbury, MN (US); Michael B. Runge, Stillwater, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 83 days.

(21) Appl. No.: 16/074,633

(22) PCT Filed: Jan. 24, 2017

(86) PCT No.: PCT/US2017/014745
§ 371 (c)(1),
(2) Date: Aug. 1, 2018

(87) PCT Pub. No.: WO2017/136189
PCT Pub. Date: Aug. 10, 2017

(65) Prior Publication Data
US 2019/0038051 A1    Feb. 7, 2019

Related U.S. Application Data

(60) Provisional application No. 62/289,474, filed on Feb. 1, 2016.

(51) Int. Cl.
*A47G 1/17*    (2006.01)
*C09J 7/22*    (2018.01)
*F16B 47/00*   (2006.01)

(52) U.S. Cl.
CPC ............. *A47G 1/175* (2013.01); *C09J 7/22* (2018.01); *F16B 47/003* (2013.01)

(58) Field of Classification Search
CPC . A47G 1/175; A47G 1/17; C09J 17/22; F16B 47/003; F16B 47/00
See application file for complete search history.

(56) References Cited

U.S. PATENT DOCUMENTS 2,647,711 A    12/1950    Margulis
2,724,568 A *  11/1955    Rabinovitch ........ A47G 1/1606
                                                            248/467

(Continued)

FOREIGN PATENT DOCUMENTS

CN    204722780    10/2015
JP    S50156327    12/1975

(Continued)

OTHER PUBLICATIONS

International Search report for PCT International Application No. PCT/US2017/014745 dated Feb. 27, 2017, 4 pages.

*Primary Examiner* — Nkeisha Smith
(74) *Attorney, Agent, or Firm* — Kevin Weber

(57) ABSTRACT

A flexible hook hanger comprises an elongate sheet of pliable backing, an adhesive layer and a hook element. The backing comprises first and second ends, a first zone positioned adjacent the first end, a second zone positioned adjacent the second end and a central zone positioned between the first and second zones. The adhesive layer is disposed on one side of the backing. The hook element is connected to the central zone. In one embodiment, the pliable backing comprises microstructured tape, and the adhesive layer comprises a pressure sensitive adhesive composition comprising one or more hydrocarbon block copolymers, and a polar phenolic tackifier. In another embodiment, at least one of the first and second zones includes a (Continued)

peel arrestor. For example, the first zone and the second zone have a first width and a second width, respectively, and the central zone has a third width that is less than at least one of the first width and the second width.

17 Claims, 14 Drawing Sheets

(56) References Cited

U.S. PATENT DOCUMENTS

| | | | |
|---|---|---|---|
| 3,012,748 A | 12/1961 | Hanger | |
| 3,052,436 A | 9/1962 | Margulis | |
| 3,180,607 A * | 4/1965 | Lee | B65D 25/102 |
| | | | 220/1.5 |
| 3,225,408 A | 12/1965 | Durham | |
| 3,241,795 A * | 3/1966 | Frye | A47G 1/17 |
| | | | 248/205.5 |
| 3,633,865 A * | 1/1972 | Hogg | A47G 1/17 |
| | | | 248/467 |
| 3,884,443 A * | 5/1975 | McMaster | A47G 1/17 |
| | | | 248/467 |
| 4,106,741 A * | 8/1978 | Hogg | A47G 1/17 |
| | | | 24/67 AR |
| 4,165,748 A | 8/1979 | Johnson | |
| 4,181,553 A * | 1/1980 | Hogg | A47G 1/17 |
| | | | 156/211 |
| 4,317,555 A * | 3/1982 | Hogg | A47G 1/168 |
| | | | 248/467 |
| 4,378,463 A * | 3/1983 | Senior | C08L 71/03 |
| | | | 174/73.1 |
| 4,671,480 A | 6/1987 | Frye | |
| 4,736,917 A | 4/1988 | Thuresson | |
| 4,847,130 A * | 7/1989 | Cooper | B65C 7/00 |
| | | | 428/41.8 |
| 5,318,835 A * | 6/1994 | Sawamoto | C09J 7/0217 |
| | | | 428/317.3 |
| 5,328,137 A | 7/1994 | Miller | |
| 5,354,597 A * | 10/1994 | Capik | A61F 13/58 |
| | | | 428/152 |
| 5,542,634 A * | 8/1996 | Pomerantz | B65D 73/0028 |
| | | | 248/205.3 |
| 5,925,459 A | 7/1999 | Zimmermann | |
| 5,967,474 A | 10/1999 | doCanto | |
| 6,403,214 B1 | 6/2002 | Zimmermann | |
| 6,517,038 B1 * | 2/2003 | Pomerantz | B31D 1/021 |
| | | | 248/214 |
| 6,569,521 B1 * | 5/2003 | Sheridan | C08G 18/758 |
| | | | 428/343 |
| 6,769,541 B1 | 8/2004 | Carriere | |
| 6,835,452 B1 | 12/2004 | Hamerski | |
| 7,762,398 B2 | 7/2010 | Tokie | |
| 8,101,276 B2 * | 1/2012 | Paul | C08G 18/10 |
| | | | 428/423.1 |
| 8,530,021 B2 | 9/2013 | Bartusiak | |
| 8,807,509 B2 | 8/2014 | Swanepoel | |
| 9,592,161 B2 | 3/2017 | Rule et al. | |
| 9,693,641 B2 * | 7/2017 | Brown | A47F 5/0006 |
| 9,765,240 B2 * | 9/2017 | Rattray | C09J 7/38 |
| 2013/0025779 A1 | 1/2013 | Bartusiak | |
| 2014/0044912 A1 | 2/2014 | Clarke | |
| 2014/0138025 A1 | 5/2014 | Bartusiak | |
| 2014/0262930 A1 | 9/2014 | Korinek | |
| 2014/0306076 A1 * | 10/2014 | Friesch | A47G 33/105 |
| | | | 248/205.3 |
| 2014/0363564 A1 | 12/2014 | Rule et al. | |
| 2015/0010700 A1 | 1/2015 | Bartusiak | |
| 2015/0034104 A1 | 2/2015 | Zhou | |
| 2015/0035556 A1 | 2/2015 | Kaltalioglu | |
| 2015/0035960 A1 | 2/2015 | Nakamura | |
| 2015/0166844 A1 | 6/2015 | Clarke | |
| 2015/0195617 A1 | 7/2015 | Kwak | |
| 2019/0359861 A1 * | 11/2019 | Runge | B32B 27/10 |

FOREIGN PATENT DOCUMENTS

| | | |
|---|---|---|
| WO | 2015-195602 | 12/2015 |
| WO | WO 2017-136280 | 8/2017 |
| WO | WO 2018-039584 | 3/2018 |

* cited by examiner (Not Part Of The Claimed Subject Matter)

(Not Part Of The Claimed Subject Matter)

(Not Part Of The Claimed Subject Matter)

(Not Part Of The Claimed Subject Matter)

(Not Part Of The Claimed Subject Matter)

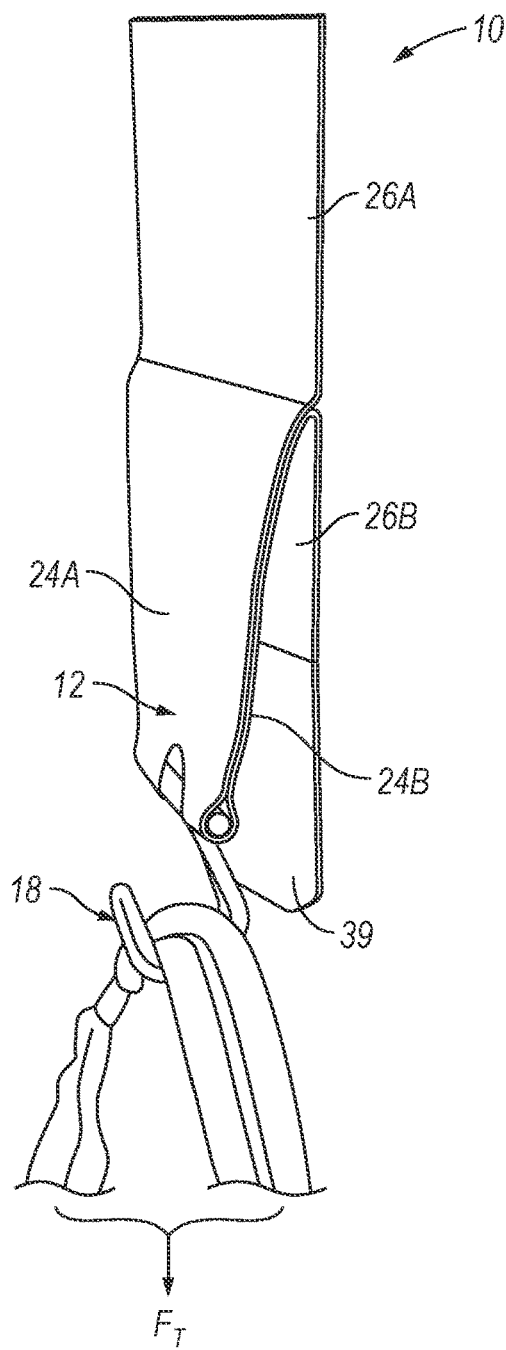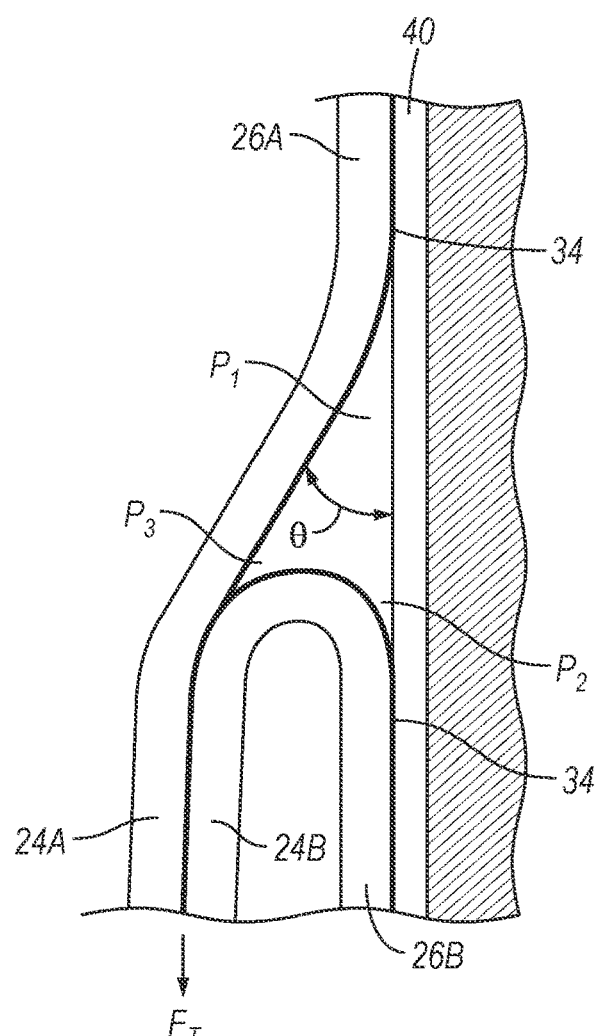
Fig. 5A
(Not Part Of The Claimed Subject Matter)
Fig. 5B (Not Part Of The Claimed Subject Matter)

(Not Part Of The Claimed Subject Matter)

(Not Part Of The Claimed Subject Matter)

(Not Part Of The Claimed Subject Matter)

(Not Part Of The Claimed Subject Matter)

(Not Part Of The Claimed Subject Matter)

(Not Part Of The Claimed Subject Matter)

(Not Part Of The Claimed Subject Matter)

(Not Part Of The Claimed Subject Matter)

(Not Part Of The Claimed Subject Matter)

(Not Part Of The Claimed Subject Matter)

(Not Part Of The Claimed Subject Matter)

(Not Part Of The Claimed Subject Matter)

FOLDING FLAP HANGER DEVICE HAVING MULTIPLE PEEL FRONTS

CROSS REFERENCE TO RELATED APPLICATIONS

This application is a national stage filing under 35 U.S.C. 371 of PCT/US2017/014745, filed Jan. 24, 2017, which claims the benefit of provisional Application No. 62/289,474, filed Feb. 1, 2016, the disclosures of which are incorporated by reference in their entirety herein.

TECHNICAL FIELD

This document pertains generally, but not by way of limitation, to hangers for suspending objects from surfaces. More specifically, without limitation, this document relates to adhesive-backed hangers that can be removed from the surface to which they have been applied.

BACKGROUND

Many hanger designs have been developed over the years in which hooks are mechanically attached to a strip of backing material that can be secured to a surface using an adhesive. It is desirable for the adhesive to be strong to support the object hung by the hanger, while also having peelability so that the hanger can be removed from the surface to which the hanger is mounted without damage if removal of the hanger is attempted. Thus, there is a continuous balance between needs in selecting an adhesive for adhesive-backed hangers. Conventional adhesive-backed hangers are described in U.S. Pat. No. 2,724,568 to Rabinovitch and U.S. Pat. No. 4,671,480 to Frye.

SUMMARY

The present inventors have recognized, among other things, that the mechanical design of an adhesive-backed hanger can affect the peelability of the adhesive and the ability of the adhesive to remain adhered to a surface under load. The inventors have developed mechanical designs for the backing material of a flexible hanger that have multiple peel fronts to improve adhesion of the hanger to the desired surface. Furthermore, such mechanical designs can be combined with adhesives having a high degree of peelability to facilitate removal of the hanger, and backing materials having a high degree of flexibility and stretchability to maintain adhesion of the hanger. The mechanical designs can include various peel arresting features in the backing material that inhibit peeling of the adhesive due to loading of the hanger, but do not interfere with the consumer being able to peel away the backing material when removal of the hanger is desired.

In one embodiment, a flexible hook hanger comprises an elongate sheet of pliable backing, an adhesive layer and a hook element. The elongate sheet of pliable backing comprises a first end, a second end, a first zone positioned adjacent the first end, a second zone positioned adjacent the second end and a central zone positioned between the first and second zones. The adhesive layer is disposed on one side of the sheet of pliable backing. The hook element is connected to the central zone. The pliable backing comprises microstructured tape, and the adhesive layer comprises a pressure sensitive adhesive having one or more hydrocarbon block copolymers, and a polar phenolic tackifier.

In another embodiment, a flexible hook hanger comprises an elongate sheet of pliable backing, an adhesive layer and a hook element. The elongate sheet of pliable backing comprises a first end, a second end, a first zone positioned adjacent the first end, a second zone positioned adjacent the second end and a central zone positioned between the first and second zones. The adhesive layer is disposed on one side of the sheet of pliable backing. The hook element is connected to the central zone. At least one of the first zone and the second zone includes a peel arrestor.

In another embodiment, a flexible hook hanger comprises an elongate sheet of pliable backing, an adhesive layer and a hook element. The elongate sheet of pliable backing comprises a first end, a second end, a first zone positioned adjacent the first end, a second zone positioned adjacent the second end and a central zone positioned between the first and second zones. The adhesive layer is disposed on one side of the sheet of pliable backing. The hook element is connected to the central zone. The first zone and the second zone have a first width and a second width, respectively, and the central zone has a third width that is less than at least one of the first width and the second width.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

FIG. 5A is an example of the folding flap hanger device of FIG. 1A with a load being applied to a hook element connected to the central flap zone in a transverse load direction.

FIG. 5B is a close-up view of the folding flap hanger device of FIG. 5A showing three peel fronts formed by the transverse loading.

Figures 1A, 1B:
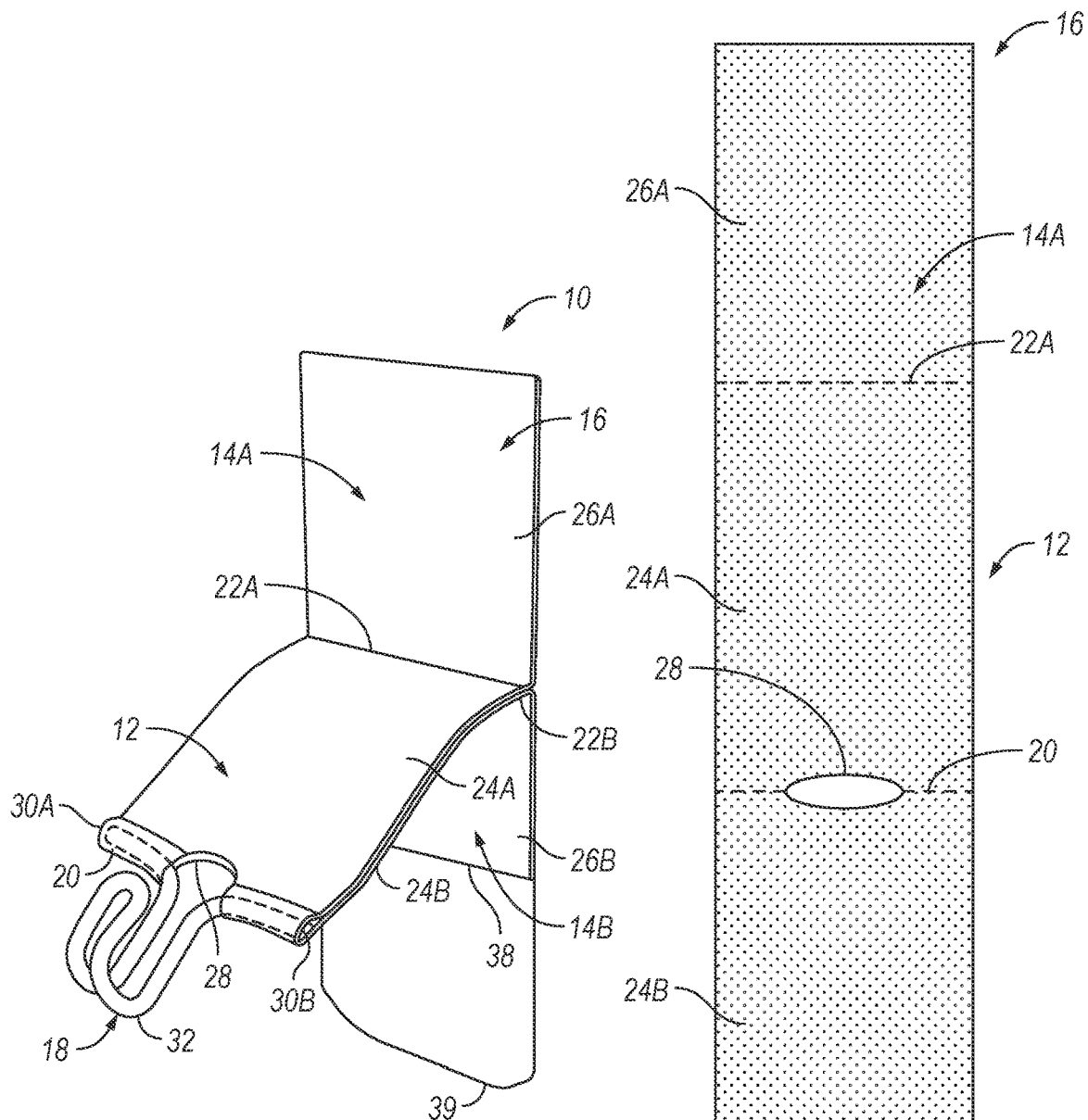
FIG. 1A is a perspective view of a folding flap hanger device of the present disclosure having a central flap zone connected to two adjoining adhesion zones.
FIG. 1B is a top view of a sheet of pliable backing material that can be folded to form the folding flap hanger device of FIG. 1A.

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

FIG. 1A is a perspective view of folding flap hanger device 10 of the present disclosure having central flap zone 12 connected to two adjoining adhesion zones 14A and 14B. Central flap zone 12 and adhesion zones 14A and 14B are formed from a single sheet of material forming backing 16. Hook element 18 is coupled to central flap zone 12. Backing 16 is folded over hook element 18 at crease 20 to form central flap zone 12, while adhesion zones 14A and 14B extend out from central flap zone 12 at creases 22A and 22B. Adhesion zones 14A and 14B can be attached to surfaces disposed at different angles and orientations, and central flap zone 12 is flexible such that hook element 18 can be used to hang items in all such angles and orientations. When adhered to one or more surfaces, panels 24A and 24B of central flap zone 12 and panels 26A and 26B of adhesion zones 14A and 14B provide folding flap hanger device 10 with up to three peel fronts that promote adhesion of device 10 to the one or more surfaces under a variety of loading orientations. Folding flap hanger device 10 can further include various peel arrestors, such as those shown in FIGS. 7A-10B.

As can be seen in FIG. 1B, backing 16 comprises a single-piece body that includes adhesion zone 14A, central flap zone 12 and adhesion zone 14B, which, when folded, comprise first panel 24A, second panel 24B, third panel 26A and fourth panel 26B. As such, central flap zone 12 is formed from first panel 24A and second panel 24B, while adhesion zones 14A and 14B comprise third panel 26A and fourth panel 26B, respectively. As will be discussed in more detail below, the adhesion of first panel 24A and second panel 24B to each other comprises a first peel front, while the adhesion of third panel 26A and fourth panel 26B to a surface comprise second and third peel fronts. The lengths of panels 24A-26B can be varied in different embodiments of folding flap hanger device 10. For example, larger sizes of panels 26A and 26B can be used to support more weight, while longer lengths of panels 24A and 24B can be used to reduce tension on the peel fronts. In other embodiments, panels 24A and 24B, and panels 26A and 26B have equal lengths, respectively. However, in other embodiments, panels 24A and 24B, and panels 26A and 26B can have different lengths, respectively.

In one embodiment, backing 16 can be monolithic, that is, uniformly formed of a single material. In various embodiments, backing 16 can be fabricated or produced from microstructured tape materials described in U.S. Pat. No. 8,530,021 to Bartusiak et al., U.S. Pub. No. 2013/0025779 to Bartusiak et al., U.S. Pub. No. 2014/0138025 to Bartusiak et al., U.S. Pub. No. 2015/0010700 to Bartusiak et al., U.S. Pub. No. 2015/0166844 to Clarke et al., and U.S. Pub. No. 2014/0044912 to Clarke et al., each of which is incorporated herein by reference in their entirety for all purposes. Such microstructured tape materials are particularly well suited for use in folding flap hanger device 10 due to their high level of flexibility, softness and stretchability. For example, because microstructured tape materials can stretch, loads applied to central flap zone 12 are distributed throughout device 10 to reduce loading on any one peel front. Flexibility of such microstructured tape materials can also even out or distribute stress across any given peel front. In other embodiments, other materials such as polymers can be used for backing 16. In other embodiments, backing 16 can be fabricated from different materials fused together, such as to produce different mechanical properties and peelability characteristics for folding flap hanger device 10. For example, backing 16 can be fabricated from relatively stiff panels 26A and 26B to inhibit peeling, and relatively flexible panels 24A and 24B to allow movement and orientation of hook element 18.

First panel 24A and second panel 24B include opening 28 for receiving hook element 18. In one embodiment, hook element comprises a bent rod having side extensions 30A and 30B and central eminence 32. Side extensions 30A and 30B are disposed within a loop formed by crease 20, while central eminence 32 projects through opening 28. As such, central eminence 32 extends away from panel 24A, while panel 24B faces toward panel 26B. Hook element 18 comprises just one example of a hanger element that can be used with folding flap hanger device 10. Other examples of hanger elements that can be used with folding flap hanger device 10 are discussed with reference to FIGS. 12-15.

Figures 2, 3:
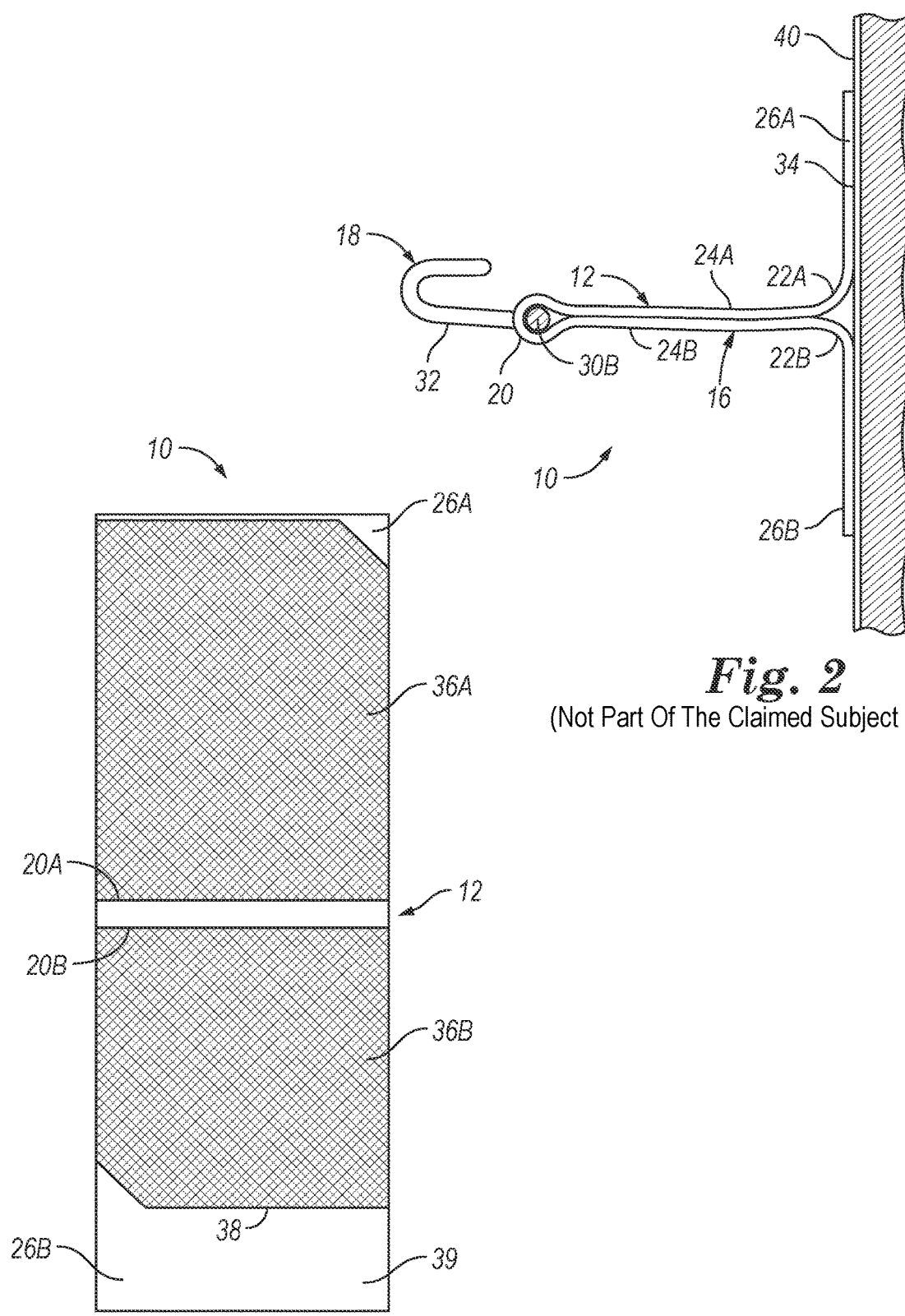
FIG. 2 is a side view of the folding flap hanger device of FIG. 1A showing an adhesive layer connecting the backing layer of FIG. 1A to a surface.
FIG. 3 is a perspective view of the folding flap hanger device of FIG. 1A showing protective sheets covering the adhesive layer on the two adjoining adhesion zones.

As can be seen in FIG. 2, a first side of panels 24A, 24B, 26A and 26B is exposed, while a second side is substantially covered with adhesive layer 34. As shown in FIG. 3, panels 26A and 26B are provided with protective sheets 36A and 36B, respectively, to cover adhesive layer 34. In one embodiment, adhesive layer 34 can be a uniformly applied coating on backing 16. However, adhesive layer 34 can also extend only as far as end line 38, thereby leaving a portion of panel 26B uncoated by adhesive layer 34. Thus, a portion of panel 26B can form pull tab 39 that can be grasped to peel panel 26B away from surface 40. Pull tab 39 can aid with removal of hanger device 10, such as by allowing panel 26B to be pulled up from an edge. Thus, because panel 26B is flexible, panel 26B can be pulled away from surface 40 along a peel front so that only a small amount of adhesive layer 34 needs to be overcome at a time. Conversely, in some conventional designs, particularly when a rigid base member is directly adhered to a surface or positioned on top of a film or backing directly adhered to a surface, the rigidity of the base member prevents a peel front from forming and causes a large surface area of adhesive to need to be overcome at one time, which can cause damage to the surface.

Adhesive layer 34 can be produced from releasable adhesive and peelable adhesive materials.

An example of a stretch releasable adhesive is found in U.S. Pat. No. 6,569,521 to Sheridan et al. Other exemplary stretch releasable adhesives can be found in Applicant's U.S. provisional application No. 62/347,265, entitled "Conformable, Stretch Releasable Adhesive Articles", the disclosure of which is incorporated herein by reference in its entirety for all purposes.

The peelable adhesive can include any peelable adhesive having the desired properties.

In some embodiments, the peelable adhesive is a pressure sensitive adhesive. A general description of useful pressure-sensitive adhesives may be found in the Encyclopedia of Polymer Science and Engineering, Vol. 13, Wiley-Interscience Publishers (New York, 1988). Additional description of useful pressure-sensitive adhesives may be found in the Encyclopedia of Polymer Science and Technology, Vol. 1, Interscience Publishers (New York, 1964). Any suitable composition, material or ingredient can be used in the pressure-sensitive adhesive. Exemplary pressure-sensitive adhesives utilize one or more thermoplastic elastomers, e.g. in combination with one or more tackifying resins.

In some embodiments, the peelable adhesive layer can include at least one of rubber, silicone, or acrylic based adhesives. In some embodiments, the peelable adhesive layer can include a pressure-sensitive adhesive (PSA) or an epoxy adhesive. In some embodiments, the peelable adhesive can include tackified rubber adhesives, such as natural rubber; olefins; silicones, such as silicone polyureas; synthetic rubber adhesives such as polyisoprene, polybutadiene, and styrene-isoprene-styrene, styrene-ethylene-butylene-styrene and styrene-butadiene-styrene block copolymers, and other synthetic elastomers; and tackified or untackified acrylic adhesives such as copolymers of isooctylacrylate and acrylic acid, which can be polymerized by radiation, solution, suspension, or emulsion techniques; polyurethanes; silicone block copolymers; and combinations of the above. The adhesive can be, for example, any of the adhesives described in any of the following patent applications, all of which are incorporated by reference herein: PCT Patent Publication Nos. 2015/035556, 2015/035960, and US 2015/034104.

In some embodiments, the adhesive includes a tackifier. Some exemplary tackifiers include at least one of polyterpene, terpene phenol, rosin esters, and/or rosin acids.

In some embodiments, the peelable adhesive is a flowable adhesive that can be coated onto the backing. In some embodiments, the peelable adhesive is a more solid adhesive as is generally described in, for example, U.S. Pat. No. 5,925,459 to Zimmermann et al., and U.S. Pat. No. 6,403,214 to Zimmermann et al., each of which is incorporated herein by reference in their entirety for all purposes.

In some embodiments, adhesion properties of the adhesive can range from 0 N/dm to 25 N/dm. In some embodiments, adhesion properties of the adhesive can range from 0.5 N/dm to 10 N/dm. In some embodiments, adhesion properties of the adhesive can range from 1 N/dm to 5 N/dm.

In some embodiments, the peelable adhesive can provide a shear force of, for example, 4-20 pounds per square inch.

In some embodiments, components of the adhesive article, such as backing 16, can be peeled from at least one of the terminal ends of panels 14A and 14b, or another suitable location. In some embodiments, the adhesive article can be peeled from at least two of the aforementioned locations.

In some embodiments, the peelable adhesives are tailored to achieve peel with no or minimal damage. Exemplary methods and articles for doing so are described in, for example, U.S. Pat. No. 6,835,452 and the U.S. provisional applications filed by the present assignee under the following application Nos. 62/289,585 and 62/379,812, each of which are incorporated herein in their entirety.

In some embodiments, the adhesive of the various embodiments described herein can be a first pressure sensitive adhesive composition disposed on at least a portion of a first side of the backing, the first pressure sensitive adhesive composition comprising one or more hydrocarbon block copolymers (e.g., a blend of a styrene-butadiene-styrene triblock copolymer and a styrene-butadiene diblock copolymer); and a polar phenolic tackifier (e.g., a terpene phenolic tackifier) comprising a phenolic moiety and having a hydroxyl value of between 20 to 130 and an acid value of less than 0.5; and, optionally, a non-polar tackifier (e.g., a terpene resin tackifier). Such a pressure sensitive adhesive composition is fully described in US Patent Publication No. 2015/195617, the entirety of which is incorporated herein.

Figure 16A:
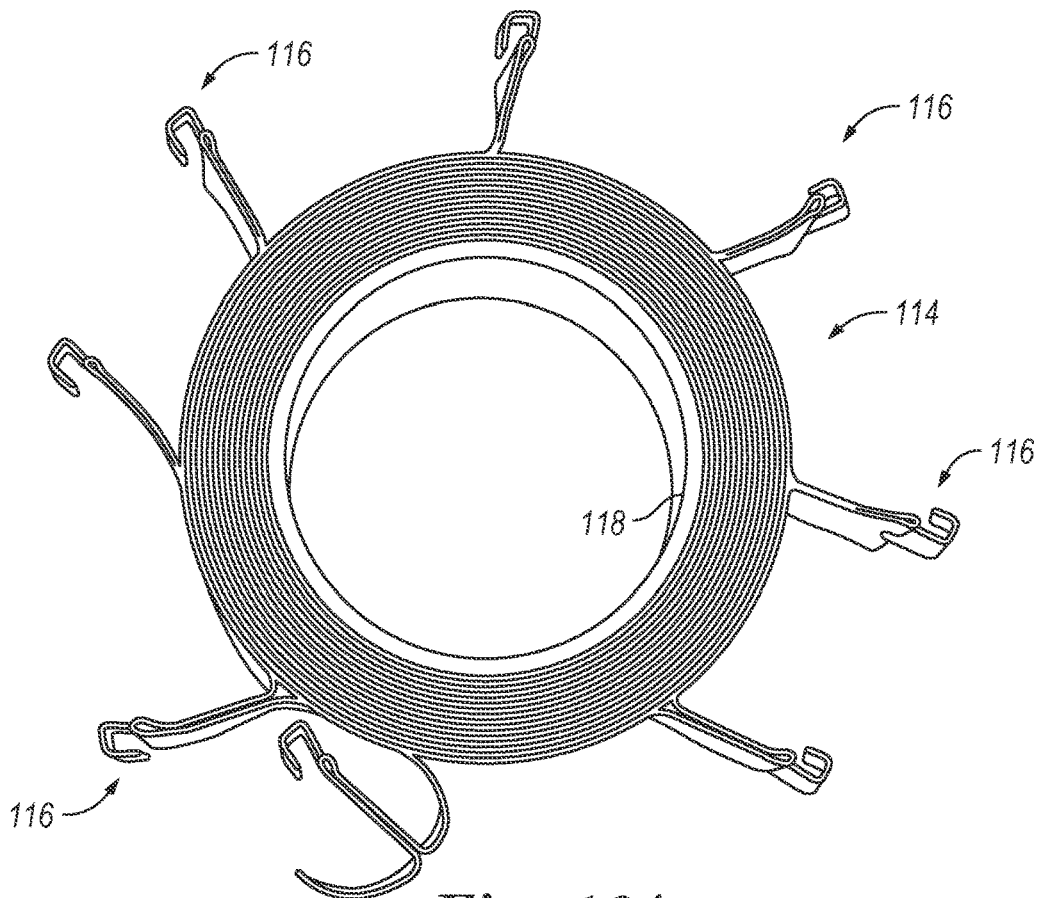
FIG. 16A is a side view of a roll of folding flap hanger devices wound around a spool.
Figure 16B:
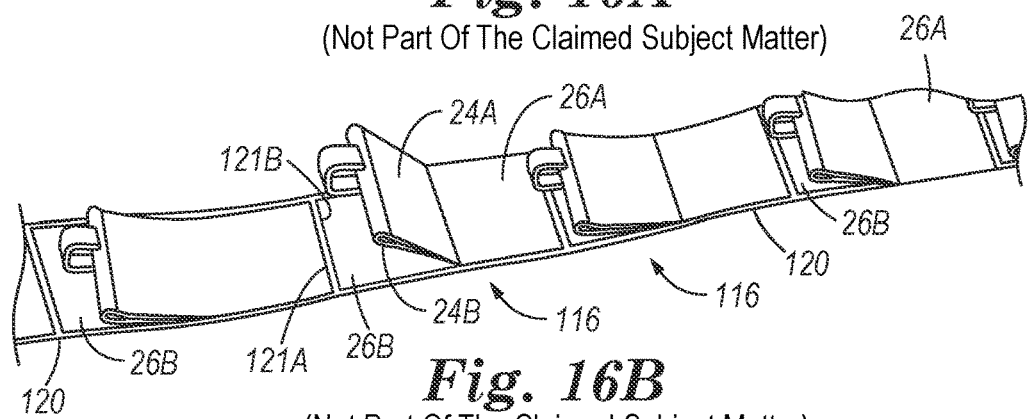
FIG. 16B is a top view of a string of folding flap hanger devices unwound from the spool of FIG. 16A having spaces in the backing between hanger devices.
Figure 17:
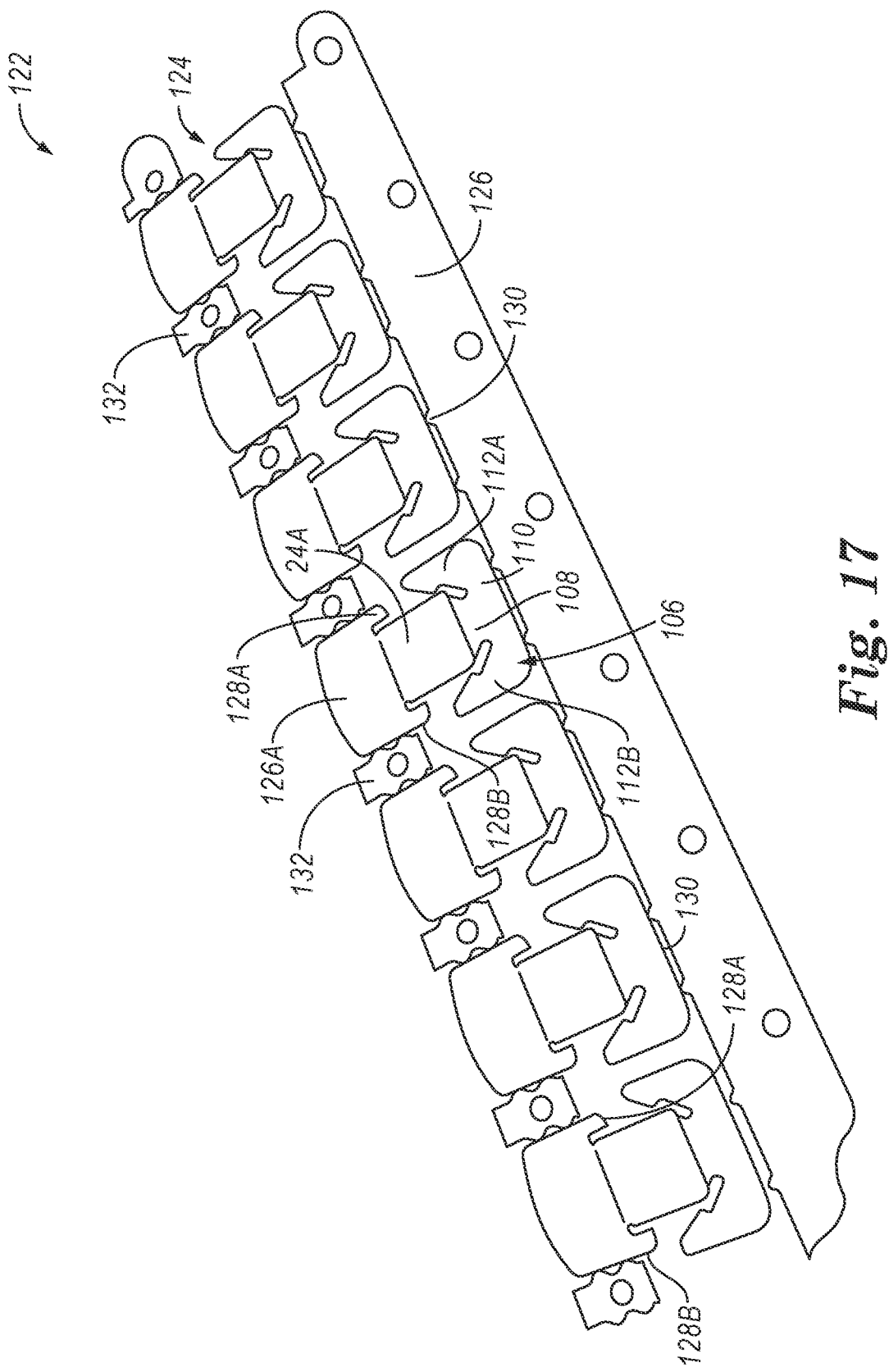
FIG. 17 is a top view of a strip of folding flap hanger devices joined to a dispenser panel.

In FIG. 2, protective sheets 36A and 36B (see FIG. 3) are removed so that folding flap hanger device 10 can be adhered to surface 40. Backing 16 can initially be provided with a single continuous peelable sheet to protect all of adhesive layer 34. As demonstrated by FIG. 3, the peelable sheet can be cut to form sub-panels, such as protective sheets 36A and 36B and one or more sheets to engage adhesive layer 34 at panels 24A and 24B. However, sheets covering adhesive layer 34 at panels 24A and 24B can be removed, either by a consumer or during production of device 10, so that panels 24A and 24B can be adhered together when backing 16 is folded to form central flap zone 12. FIGS. 16A, 16B and 17 show other examples of the coupling of protective sheets to adhesive layer 34. For example, in FIG. 17, the protective sheet can be cut to have the shape of panels 26A and 26B.

As can be seen in FIG. 2, backing 16 is attached to surface 40 at two different locations on opposite sides of central flap zone 12, thereby forming two peel fronts. In the described embodiment, central flap zone 12 comprises two panels of backing 16 joined by two portions of adhesive layer 34, thereby forming another peel front. In another embodiment, adhesive layer 34 can be omitted between panels 24A and 24B, and panels 24A and 24B can be welded or otherwise fixed together to eliminate a peel front. Thus, a plurality of peel fronts can be provided that improve the ability of folding flap hanger device 10 to remain attached to surface 40 even when under loading at various angles and orientations, as discussed with reference to FIGS. 4A-6.

Figure 4A:
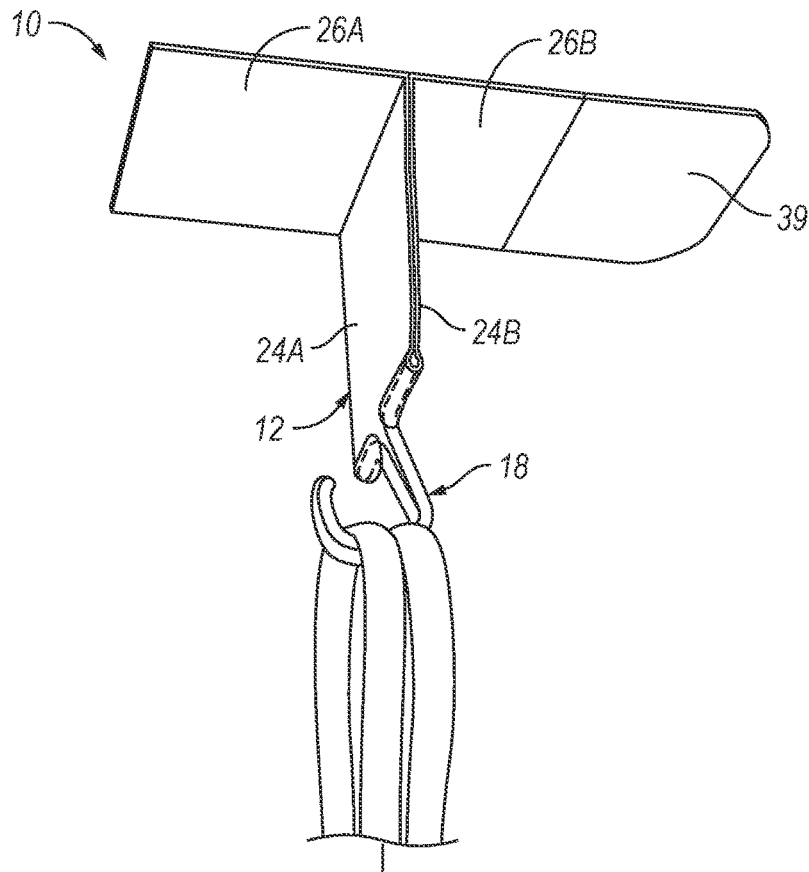
FIG. 4A is an example of the folding flap hanger device of FIG. 1A with a load being applied to a hook element connected to the central flap zone in a normal load direction.
Figure 4B:
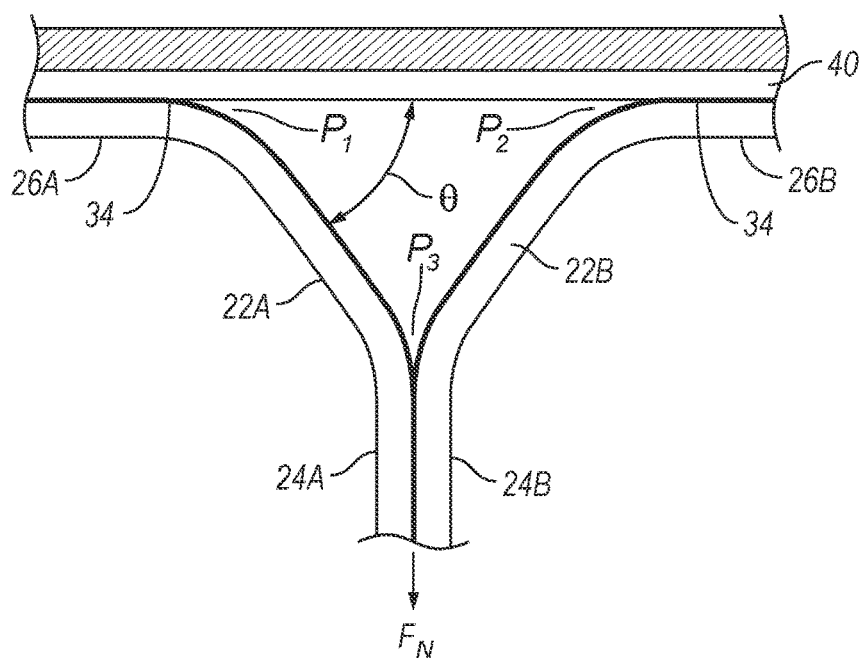
FIG. 4B is a close-up view of the folding flap hanger device of FIG. 4A showing three peel fronts formed by the normal loading.

FIG. 4A is an example of folding flap hanger device 10 of FIG. 1A with normal loading $F_N$ being applied to hook element 18 connected to central flap zone 12 in a normal load direction. FIG. 4B is a close-up view of folding flap hanger device 10 of FIG. 4A showing three peel fronts $P_1$, $P_2$ and $P_3$ formed by normal loading $F_N$. Normal loading $F_N$ can arise, for example, when adhesion zones 14A and 14B are applied to a horizontal surface, such as when surface 40 comprises a ceiling.

Peel fronts P1 and P2 are formed between surface 40 and adhesive layer 34 at panels 26A and 26B. Peel fronts P1 and P2 are opposed at one-hundred-eighty degrees from each other such that the total peel force is a summation of each peel front. Peel front P3 is formed between panels 24A and 24B.

The steady-state peel force for multi-peel front arrangements, such as those in FIG. 4B, is governed by Equation [1], where P is the total peel force, b is the width of backing 16, and $G_a$ is the adhesion energy of adhesive layer 34 with backing 16.

$$P/b=2G_a/(1-\cos\theta)\sin\theta \qquad \text{Equation [1]}$$

An advantage of folding flap hanger device 10 is that when normal loading $F_N$ is applied, the angles between crease 22A and surface 40 and between crease 22B and surface 40 are equal such that the required peel force is doubled. Adhesive layer 34 at peel front P3 has a tendency to draw panels 24A and 24B toward each other, thereby improving the resistance to peel at peel fronts P1 and P2. As such, folding flap hanger device 10 is particularly well suited for use on overhead surfaces.

FIG. 5A is an example of folding flap hanger device 10 of FIG. 1A with transverse loading $F_T$ being applied to hook element 18 connected to central flap zone 12 in a transverse load direction. FIG. 5B is a close-up view of folding flap hanger device 10 of FIG. 5A showing three peel fronts formed by transverse loading $F_T$. Transverse loading $F_T$ can arise, for example, when adhesion zones 14A and 14B are applied to a vertical surface, such as when surface 40 comprises a wall.

Equation [1] still governs the steady-state peel force of FIG. 5A. However, in such an orientation the second peel force P2 dominates. However, peel force P2 is larger than peel force P1 or P2 in FIG. 4B due to the shallow angle of angle θ in FIG. 5B such that folding flap hanger device 10 is well suited for use on vertical surfaces.

In one embodiment, the length of panel 26B can be shorter than the length of panel 26A such that device 10 is intended to be used in the particular orientation of FIGS. 5A and 5B. In such a configuration, panel 26A dominates the adhesion capability of folding flap hanger device 10 such that the adhesion capability of panel 26B can be abbreviated by shortening its length. Such a configuration is still advantageous due to the presence of at least two peel fronts.

Figure 6:
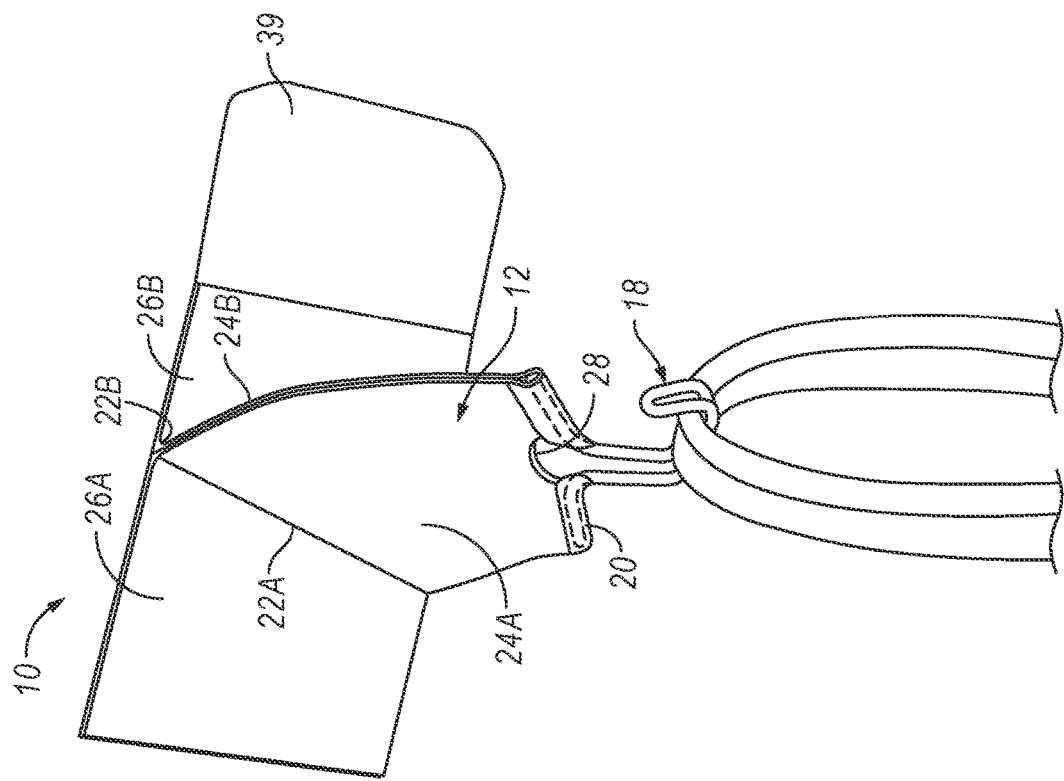
FIG. 6 is an example of the folding flap hanger device of FIG. 1A with a load being applied to a hook element connected to the central flap zone in a lateral load direction.

FIG. 6 is an example of folding flap hanger device 10 of FIG. 1A with lateral loading $F_L$ being applied to hook element 18 connected to central flap zone 12 in a lateral load direction. With lateral loading, folding flap hanger device 10 undergoes a hybrid or combination of the normal load direction of FIG. 4A and the transvers load direction of FIG. 5A. The backing material and adhesive described above are particularly well suited for handling lateral loading. In particular, the flexibility and length of central flap zone 12 minimize edge forces such as at the side of central flap zone 12 opposite the lateral loading. For example, the length of central flap zone 12 allows hook element 18 to be repositioned in a direction such that the loading is parallel to the distal end of central flap zone 12, thereby allowing the loading to be distributed over the width of central flap zone 12. Also, the stretchability of central flap zone 12 provide by backing 16 also distributes the loading across central flap zone 12 and, consequently, panels 26A and 26B. Furthermore, the peel arresting features described herein below additionally prevent the lateral loading from undesirably causing peeling of adhesive layer 34 from surface 40.

Figure 7A:
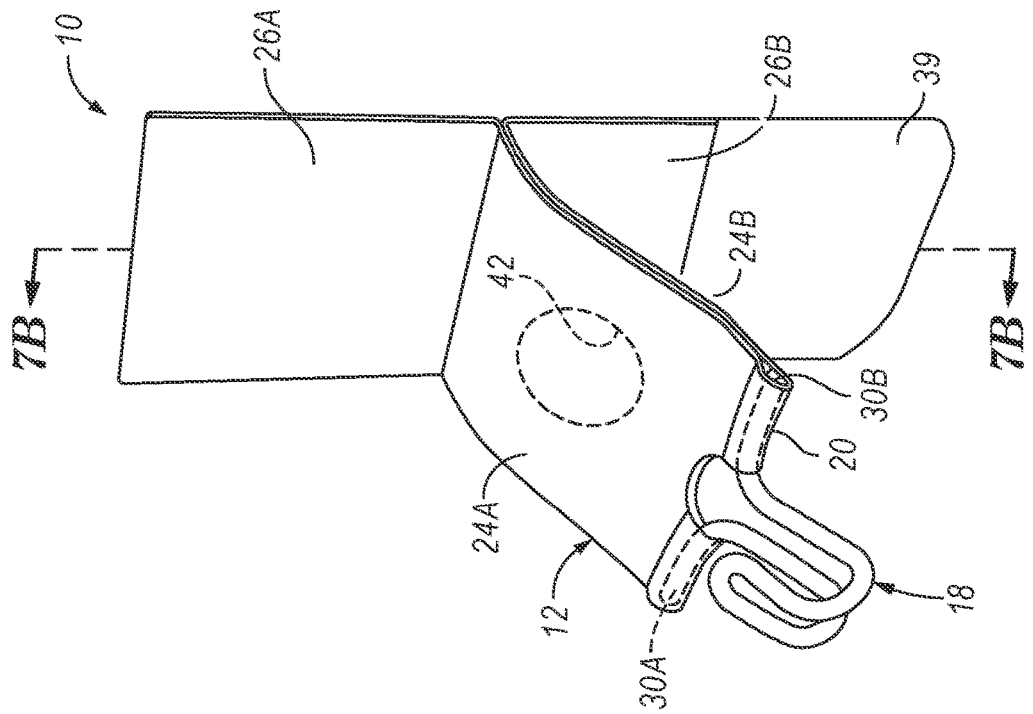
FIG. 7A is a perspective view of an embodiment of the folding flap hanger device of FIG. 1A showing a window in the central flap zone.
Figure 7B:
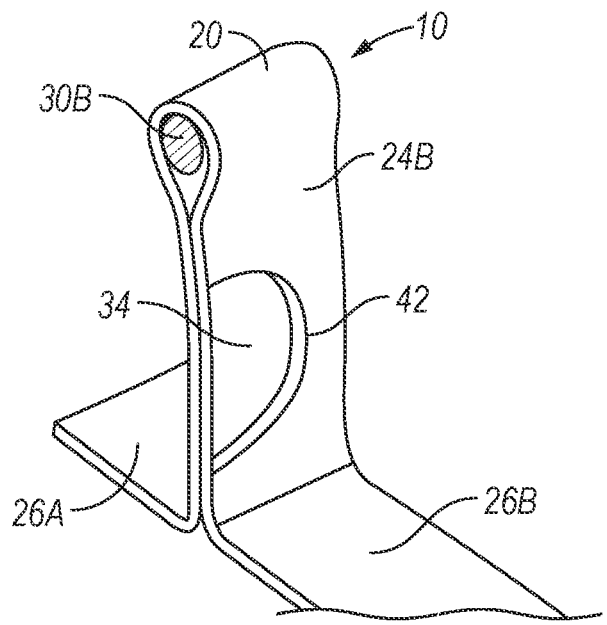
FIG. 7B is a perspective cross-sectional view of the folding flap hanger device of FIG. 7A showing the window in one panel of the central flap zone adjacent another panel of the central flap zone.
Figure 7C:
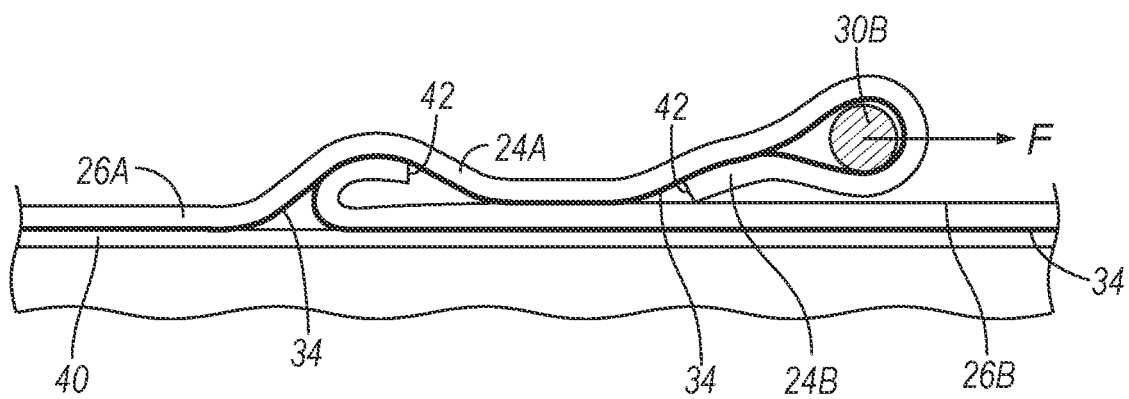
FIG. 7C is a side cross-sectional view of the folding flap hanger device of FIG. 7B showing the central flap zone being adhering to one of the adjoining adhesion zones through the window.

FIG. 7A is a perspective view of an embodiment of folding flap hanger device 10 of FIG. 1A showing window 42 in central flap zone 12. FIG. 7B is a perspective cross-sectional view of folding flap hanger device 10 of FIG. 7A showing window 42 in panel 24B of central flap zone 12 adjacent panel 26B of central flap zone 12. FIG. 7C is a side cross-sectional view of folding flap hanger device 10 of FIG. 7B showing central flap zone 12 being adhered to adjoining adhesion zones 14B through window 42. Window 42 allows central flap zone 12 to temporarily lie flat against panel 26B to facilitate easier handling and application of hanger device 10. In use, the bond between panel 24A and panel 26B through window 42 may become broken so central flap zone 12 can be reoriented and stretch. In another example, window 42 can allow adhesive layer 34 on central flap zone 12 to more lastingly adhere to panel 26B by using a stiff material for panels 24A and 24B, thereby relieving some of the peel force between panel 26A and surface 40. Window 42 thus helps distribute loading on hook element 18 throughout folding flap hanger device 10. The size, shape and location of window 42 can vary in different embodiments of folding flap hanger device 10.

Figures 8A, 8B:
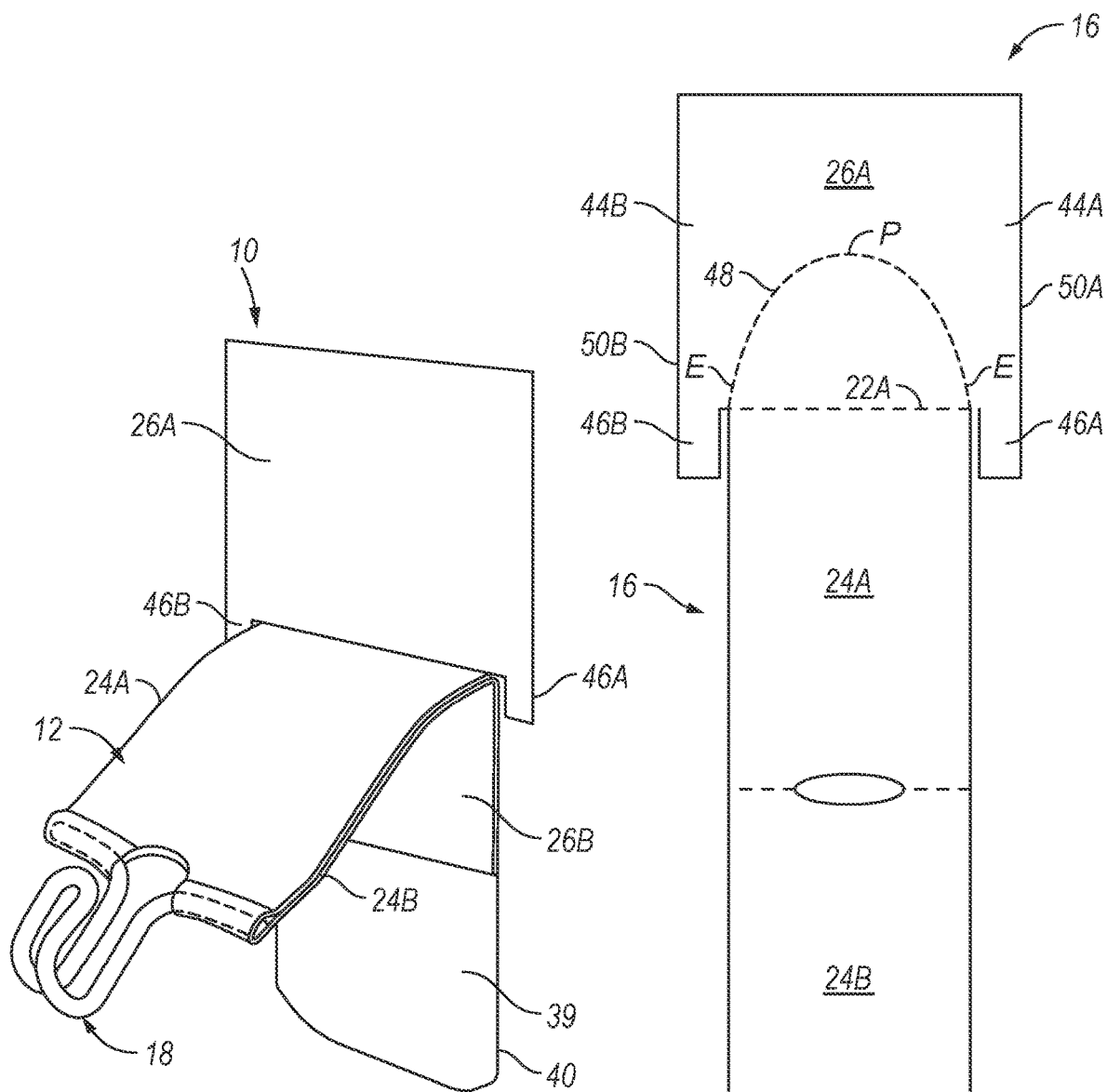
FIG. 8A is a perspective view of an embodiment of the folding flap hanger device of FIG. 1A showing side flaps extending from an adhesion zone adjoining the central flap zone.
FIG. 8B is a top view of a sheet of pliable backing material that can be folded to form the folding flap hanger device of FIG. 8A.

FIG. 8A is a perspective view of an embodiment of folding flap hanger device 10 of FIG. 1A showing side flaps 44A and 44B extending from panel 26A of adhesion zone 14A adjoining central flap zone 12. FIG. 8B is an embodiment of sheet of pliable backing 16 that can be folded to form folding flap hanger device 10 of FIG. 8A. Side flaps 44A and 44B include tabs 46A and 46B, respectively. Backing 16 forms a modified T-shape in FIG. 8B.

Side flaps 44A and 44B enlarge the width of panel 26A as compared to other embodiments of backing 16. In the embodiment of FIG. 8B, panel 26A is also wider than panels 24A, 24B and panel 26B. Thus, when folded, panel 26A projects laterally beyond panels 24A, 24B and 26B. Tabs 46A and 46B extend longitudinally (relative to the vertical axis of backing 16 in FIG. 8B) from side flaps 44A and 44B and are configured to adhere to surface 40 alongside panel 26B. Side flaps 44A and 44B increase the surface area of panel 26A, thereby increasing the ability of adhesion zone 14A to adhere to surface 40. When device 10 is folded, tabs 46A and 46B extend from side flaps 44A and 44B across central flap zone 12 (as shown in FIG. 8A) to be disposed alongside panel 26B, thereby extending across peel fronts P1 and P2 (FIG. 4B).

Side flaps 44A and 44B and tabs 46A and 46B prevent peel front 48 from reaching edges 50A and 50B of panel 26A, which helps keep adhesion zone 14A adhered to surface 40. For example, the peak P of peel front 48 pushes out toward the distal (top in FIG. 8B) edge of panel 26A as more load is applied to hook element 18, while side flaps 44A and 44B keep the edges E of peel front 48 within the boundary of adhesion zone 14A. In some conventional hanger configurations, the peel front has an inverted shape as compared to peel front 48. Thus, a trough is formed near crease 22A and edges of the peel front move upward and outward, toward the edges of the adhesion zone, as more load is applied. Once the edges of this inverted peel front reach the edges of the adhesion zone, the hanger can quickly become detached. In the example of hanger 10 in FIG. 8A, side flaps 44A and 44B can invert the conventional peel front to peel front 48 and keep the edges of the peel front away from the edges of the hanger, forcing the peel front to move centrally through panel 26A toward the distal edge. Side flaps 46A and 46B additionally prevent peel front 48 from moving sideways, particularly under lateral loading such as is shown in FIG. 6.

Figure 9B:
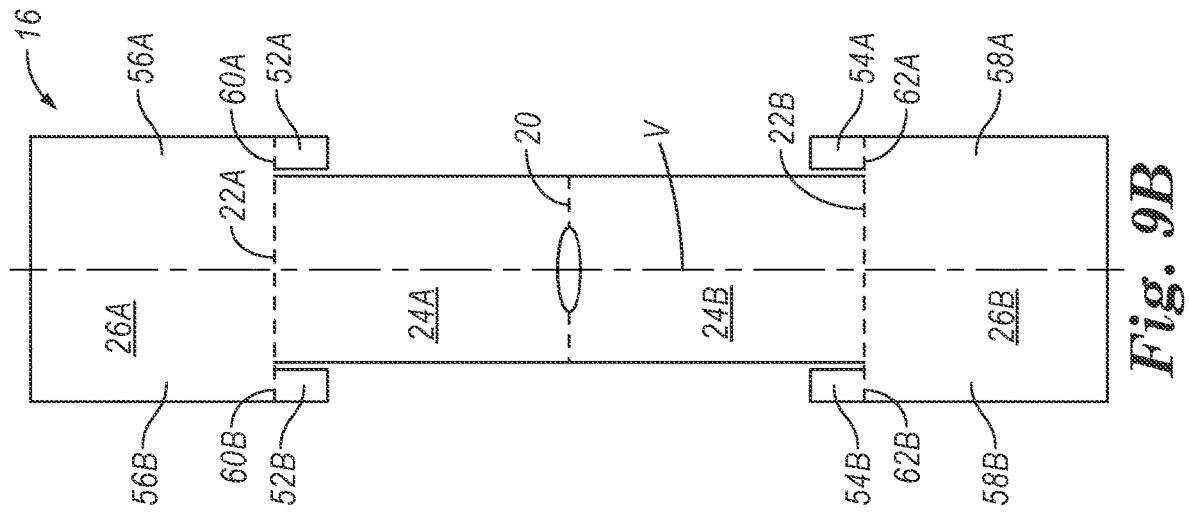
FIG. 9B is a top view of a sheet of pliable backing material that can be folded to form the folding flap hanger device of FIG. 9A.
Figure 9A:
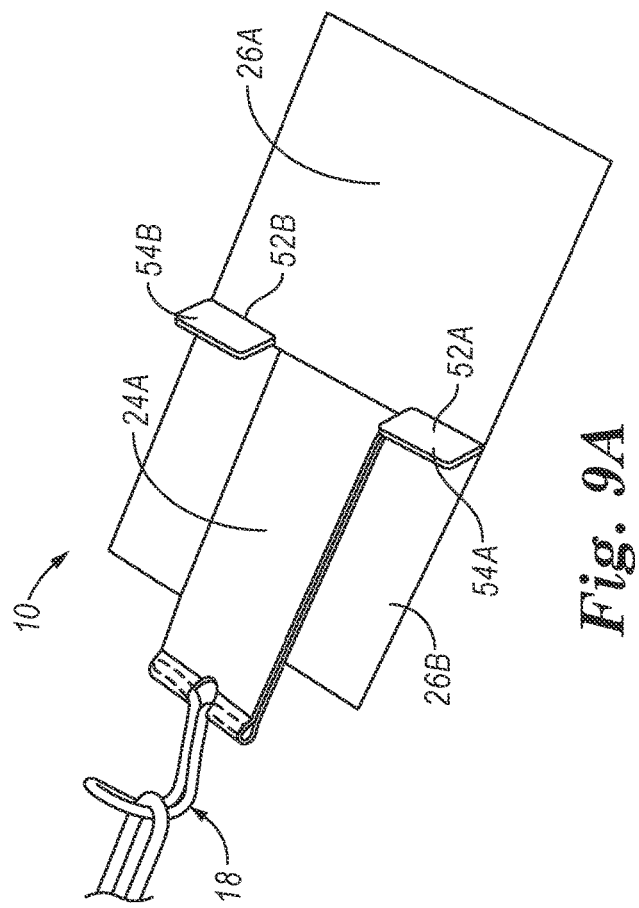
FIG. 9A is a perspective view of an embodiment of the folding flap hanger device of FIG. 1A showing upstanding facing flaps extending from the adhesion zones adjoining the central flap zone.

FIG. 9A is a perspective view of an embodiment of folding flap hanger device 10 of FIG. 1A showing upstanding facing flaps 52A, 52B and 54A, 54B extending from side flaps 56A, 56B and 58A and 58B, respectively, of adhesion zones 14A, 14B, respectively, adjoining central flap zone 12. FIG. 9B is an embodiment of sheet of pliable backing 16 that can be folded to form folding flap hanger device 10 of FIG. 9A. Backing 16 forms a modified I-shape in FIG. 9B.

Side flaps 56A and 56B enlarge the width of panel 26A as compared to other embodiments of backing 16, while side flaps 58A and 58B enlarge the width of panel 26B as compared to other embodiments of backing 16. In the embodiment of FIG. 9B, side flaps 56A and 56B also extend panel 26A wider than panel 24A, and side flaps 56A and 58B also extend panel 26B wider than panel 24B. Thus, when folded, panel 26A projects laterally beyond panel 24A, and panel 26B projects laterally beyond panel 24B. Tabs 52A and 52B extend longitudinally (relative to the vertical axis V of backing 16 in FIG. 9B) from side flaps 56A and 56B. Tabs 54A and 54B extend longitudinally (relative to the vertical axis of backing 16 in FIG. 9B) from side flaps 58A and 58B. Tabs 54A and 54B are configured to adhere to tabs 52A and 52B, respectively, to form upstanding portions alongside central flap zone 12. As such, tabs 52A-54B include creases 60A, 60B and 62A, 62B when folded. Side flaps 56A, 56B, 58A and 58B function similarly to side flaps 44A and 44B of FIGS. 8A and 8B to increase the surface area of adhesion zones 14A and 14B and thereby increase the adhesion of folding flap hanger device 10. Tabs 52A-54B function to, among other things, distribute loading of hook element 18 throughout both of panels 26A and 26B to minimize edge loading effects that can propagate peeling and separation of panels 26A and 26B from surface 40.

Figure 10B:
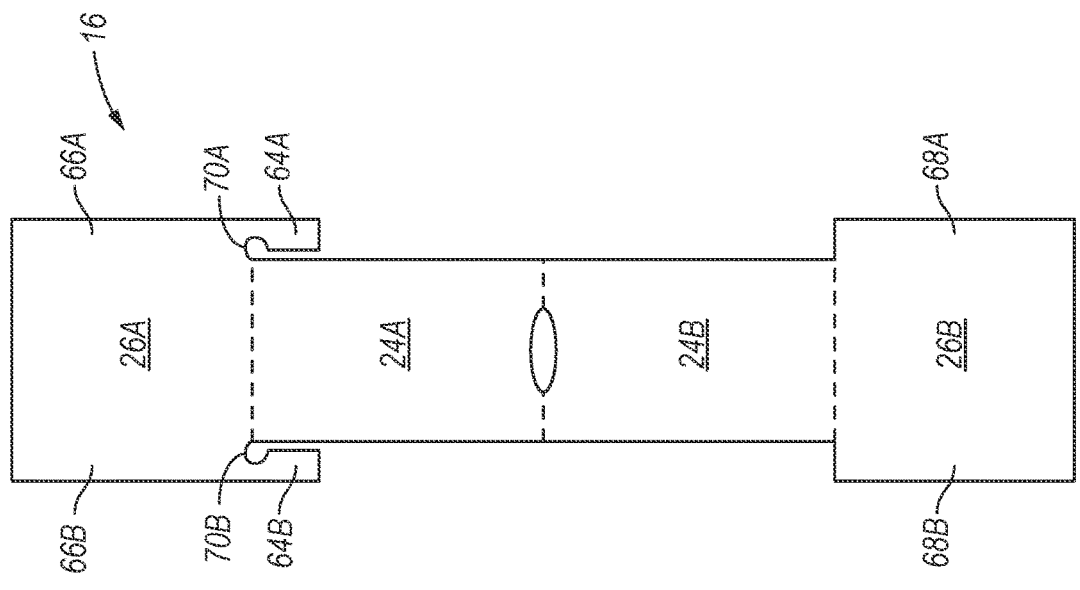
FIG. 10B is a top view of a sheet of pliable backing material that can be folded to form the folding flap hanger device of FIG. 10A.
Figure 10A:
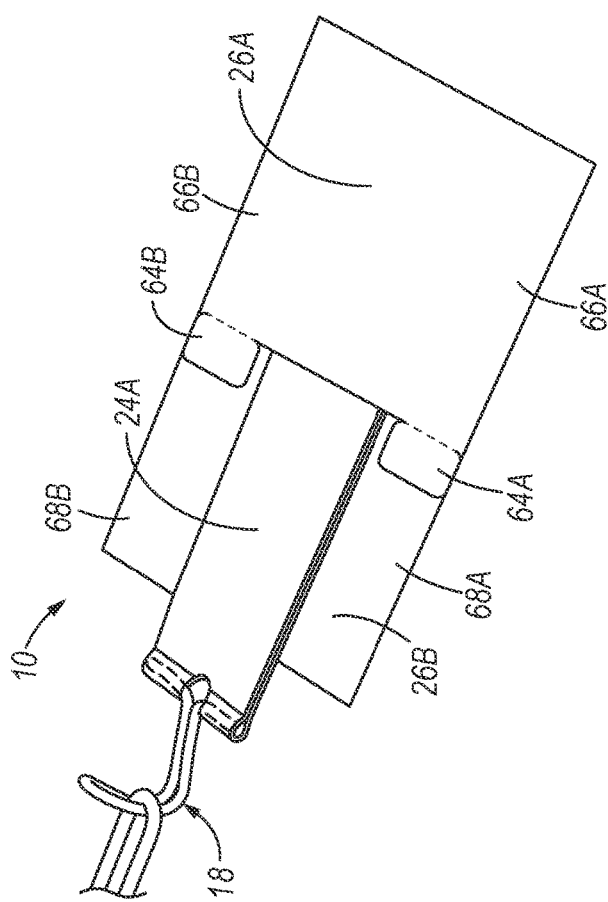
FIG. 10A is a perspective view of an embodiment of the folding flap hanger device of FIG. 1A showing overlapping flaps extending from the adhesion zones adjoining the central flap zone.

FIG. 10A is a perspective view of an embodiment of folding flap hanger device 10 of FIG. 1A showing overlapping flaps 64A and 64B extending from side flaps 66A and 66B of panel 26A of adhesion zone 14A adjoining central flap zone 12. Panel 26B includes side flaps 68A and 68B. FIG. 10B is an embodiment of sheet of pliable backing 16 that can be folded to form folding flap hanger device 10 of FIG. 10A.

Side flaps 66A and 66B extend panel 26A wider than panel 24A. Side flaps 68A and 68B extend panel 26B wider than panel 24B. Thus, when folded, panel 26A projects laterally beyond panel 24A, and panel 26B projects laterally beyond panel 24B. Tabs 64A and 64B extend longitudinally (relative to the vertical axis of backing 16 in FIG. 10B) from side flaps 66A and 66B. Side flaps 66A-68B thus increase the surface area and adhesion of panels 26A and 26B.

Tabs 64A and 64B are configured to adhere to side flaps 68A and 68B, respectively, to form overlapping portions alongside central flap zone 12. Tabs 64A and 64B function to, among other things, distribute loading of hook element 18 throughout both of panels 26A and 26B to minimize edge loading effects that can propagate peeling and separation of panels 26A and 26B from surface 40. Tabs 64A and 64B can include stress reliefs 70A and 70B alongside side flaps 66A and 66B, respectively, to inhibit transfer of forces from central flap zone 12 to panel 26A. In one embodiment, stress reliefs 70A and 70B can have circular shapes that are tangent to panel 24A.

Figure 11A:
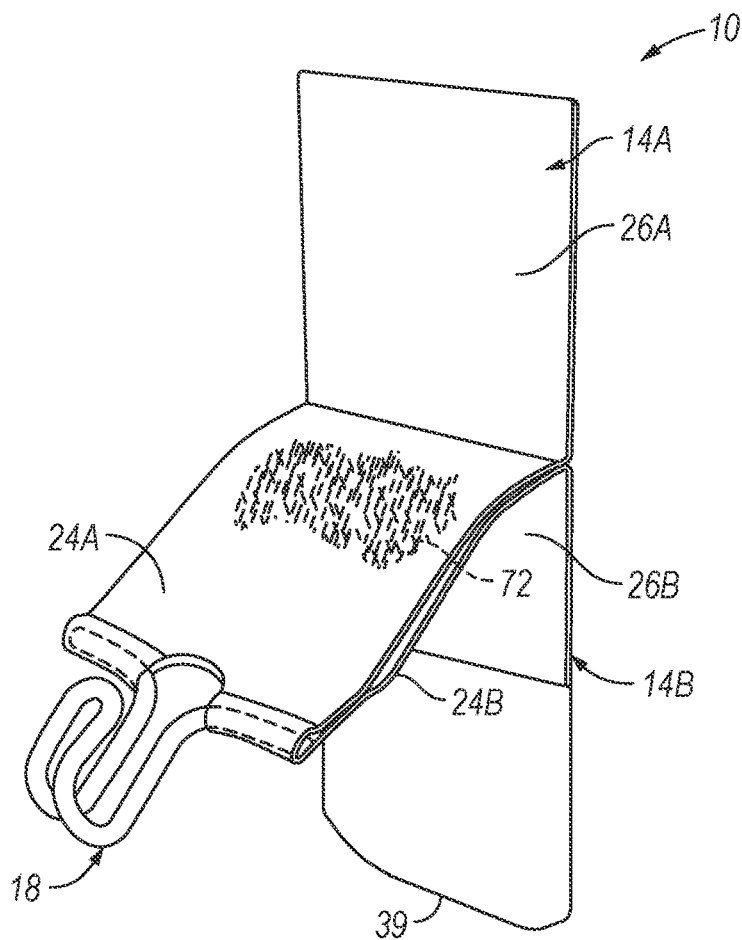
FIG. 11A is a perspective view of an embodiment of the folding flap hanger device of FIG. 1A showing one of the adjoining adhesion zones including a high tension region.
Figure 11B:
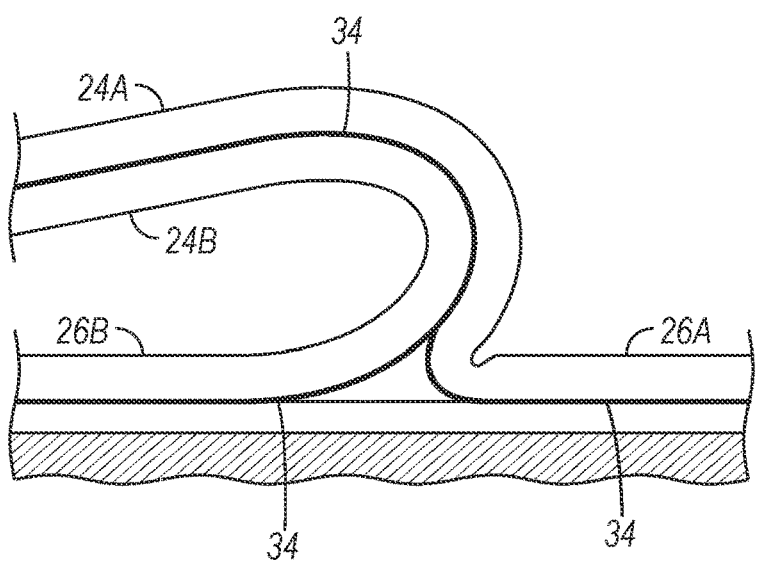
FIG. 11B is a side view of the folding flap hanger device of FIG. 11A showing the high tension region biasing the central flap zone toward one of the adjoining adhesion zones.

FIG. 11A is a perspective view of an embodiment of folding flap hanger device 10 of FIG. 1A showing one of adjoining adhesion zones 14A and 14B including high tension region 72. FIG. 11B is a is a side view of folding flap hanger device 10 of FIG. 11A showing high tension region 72 biasing central flap zone 12 toward adjoining adhesion zone 14B.

High tension region 72 can be positioned adjacent crease 22B. High tension region 72 can be imparted into panel 24B during manufacturing of hanger device 10. For example, panel 24B can be shaped to have an initial length less than that of panel 24A. Panel 24B can be stretched to the length of panel 24A while panel 24A and panel 24B are adhered together to form central flap zone 12. When the tension on panel 24B is released, panel 24B will tend to shrink back down to its original length, thereby causing central flap zone 12 to flop over toward panel 26B, as panel 24A tends to remain at its original length. Such a feature pre-configures hanger device 10 into an orientation ready for use.

Figure 12:
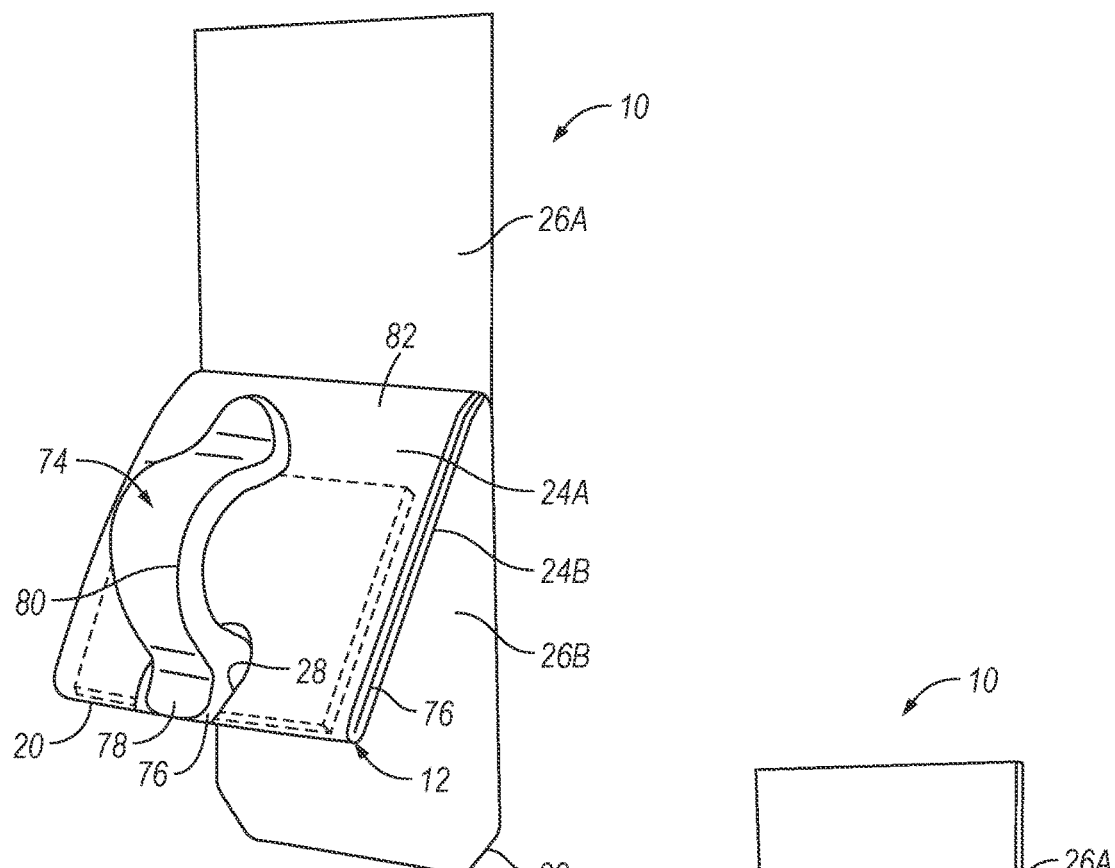
FIG. 12 is an embodiment of a folding flap hanger device in which the central flap zone includes a hook element embedded between panels of the central flap zone.

FIG. 12 is an embodiment of folding flap hanger device 10 in which central flap zone 12 includes hook element 74 embedded between panels 74A and 74B of central flap zone 12. Hook element 74 includes base pad 76, pedestal 78 and hook 80.

In the embodiment shown, base pad 76 is planar and has a width substantially the same as, but slightly smaller, than the widths of panels 74A and 74B. Base pad 76 is, however, shorter than the length of panels 74A and 74B so that central flap zone 12 still includes flexible portion 82. Flexible portion 82 comprises a portion of panels 74A and 74B that are adhered to each other with adhesive layer 34 between panels 26A and 26B and base pad 76, thereby allowing central flap element to maintain flexibility.

Pedestal 78 is positioned to extend through opening 28 and can be used to locate base pad 76 between flaps 24A and 24B. Hook 80 comprises a C-shaped member extending from pedestal 78 and curving back toward base pad 76. Base pad 76 of hook element 74 spreads forces applied to hook 80 across panels 24A and 24B. Thus, less force is concentrated at the edges of panels 26A and 26B, inhibiting the propagation of peel fronts.

Figure 13:
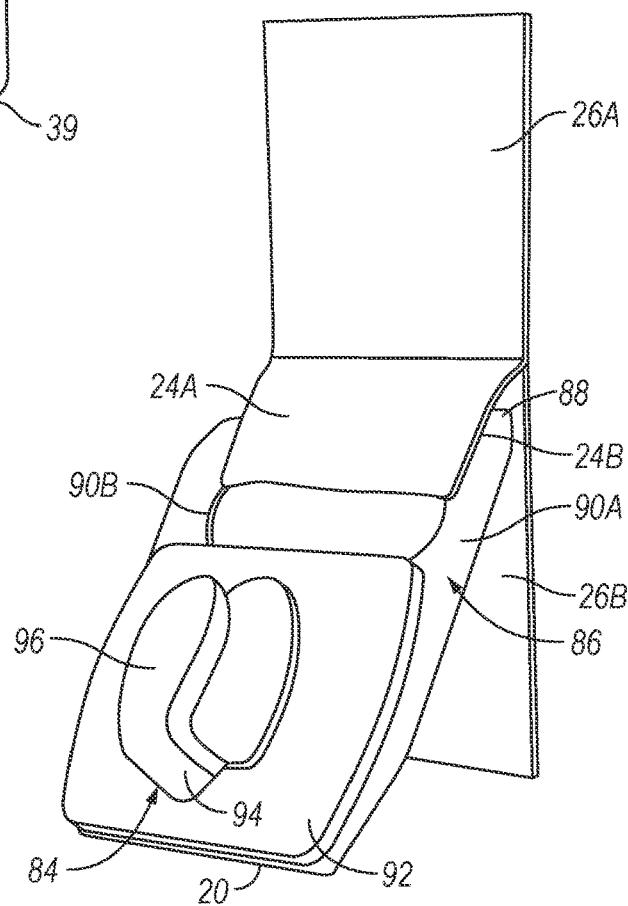
FIG. 13 is an embodiment of a folding flap hanger device in which the central flap zone includes a hook element connected to the central flap zone via a buckle structure.

FIG. 13 is an embodiment of folding flap hanger device 10 in which central flap zone 12 includes hook element 84 connected to central flap zone 12 via buckle structure 86. Hook element 84 also includes bar 88 connectors 90A and 90B, base pad 92, pedestal 94 and hook 96.

Hook element 84 is coupled to backing 16 via looping of panels 24A and 24B around bar 88 at crease 20. Connectors 90A and 90B extend from sides of bar 88 outside of the widths of panels 24A and 24B. Connectors 90A and 90B extend forward from bar 88 to connect to base pad 92. Pedestal 94 is mounted on base pad 92 and hook 96 extends from pedestal 94.

Buckle structure 86 of hook element 84 allows for a wide variety of hooks to be used with folding flap hanger device 10. For example, bar 88 can have a common configuration for embedding between panels 24A and 24B, but any type of base pad and hook can be connected thereto via connectors 90A and 90B. The configuration of FIG. 13 also simplifies the production of backing 16. For example, central flap zone 12 can be shortened, as panels 24A and 24B need only be long enough to wrap around bar 88 and provide a short additional length for flexibility. Also, central flap zone 12 need not include an opening at crease 20 to accommodate hook 96.

Figure 14:
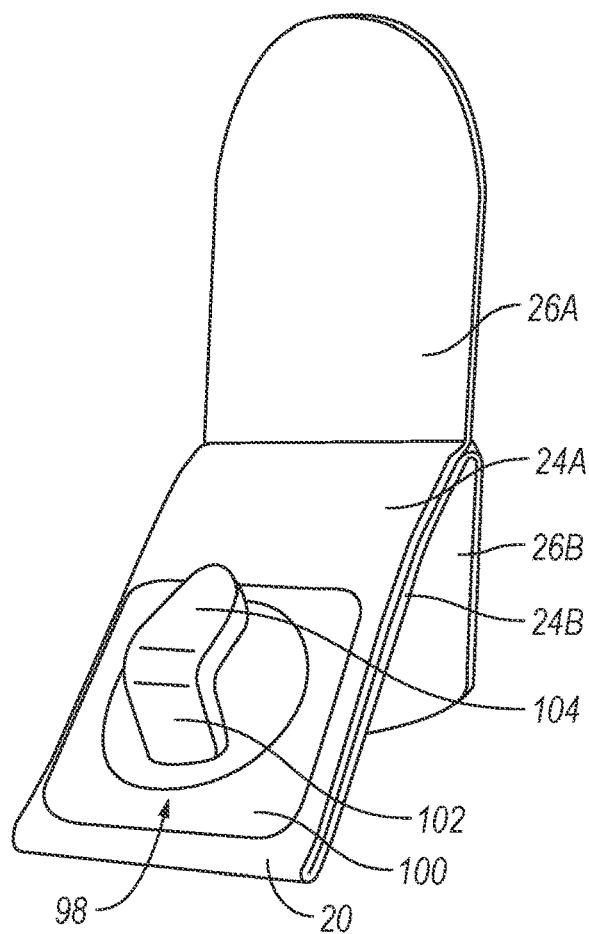
FIG. 14 is an embodiment of a folding flap hanger device in which the central flap zone includes a hook element connected to an exterior of the central flap zone.

FIG. 14 is an embodiment of folding flap hanger device 10 in which central flap zone 12 includes hook element 98 connected to an exterior of central flap zone 12. Hook element 98 includes base pad 100, pedestal 102 and hook 104.

Folding flap hanger device 10 includes the same elements as those of FIGS. 1A and 12, but does not include opening 28. Central flap zone 12 is long enough to provide surface area for the attachment of a desirable hook element plus an additional length to allow for flexibility. For example, panels 24A and 24B can be long enough to accommodate base pad 100. However, rather than embedding base pad 100 between panels 24A and 24B, as is done in the embodiment of FIG. 12, base pad 100 is mounted to the exterior of central flap zone 12. In other embodiments, any suitable hook element can be used. For example, base pad 76 and the rest of hook element 74 in FIG. 12 can be used with central flap zone 12 of FIG. 14. Pedestal 102 is positioned centrally on base pad 100, with hook 104 extending from pedestal 102 back toward panel 26A. As such, base pad 100 can distribute the loading from hook 104 through pedestal 102 equally to panels 24A and 24B, thereby reducing the load at the edges of panels 26A and 26B near the peel fronts.

Figure 15:
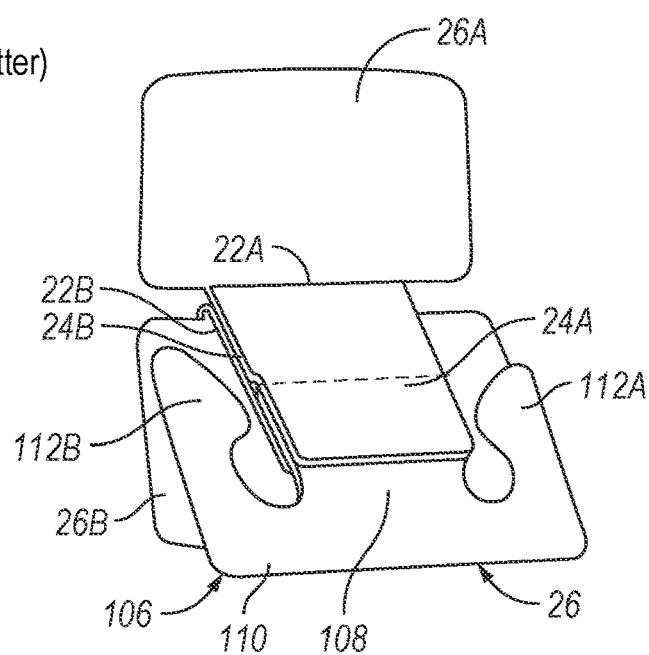
FIG. 15 is an embodiment of a folding flap hanger device in which the central flap zone includes a hook element positioned between panels of the central flap zone.

FIG. 15 is an embodiment of folding flap hanger device 10 in which central flap zone 12 includes hook element 106 positioned between panels 24A and 24B of central flap zone 12. Hook element 106 includes stem 108, crossbar 110 and hooks 112A and 112B.

Folding flap hanger device 10 includes the same elements as those of FIGS. 1A and 12, but does not include opening 28 and crease 20. Instead of forming a crease at the distal end of central flap zone 12, panels 24A and 24B are separated from each other so that stem 108 can be inserted therebetween. In other words, adhesive layer 34 of panels 24A and 24B is applied directly to stem 108. Stem 108 does not extend all the way down to creases 22A and 22B to allow central flap zone 12 the ability to flex and twist. Crossbar 110 extends transverse to stem 108 and supports hooks 112A and 112B. Crossbar 110 and hooks 112A and 112B are coplanar with stem 108 and therefore can be easily manufactured from film material using a cutting process, such as die cutting, laser cutting or stamping. Thus, folding flap hanger device 10 of FIG. 15 can be easily manufactured and can be arranged in rolls, as shown in FIG. 16A, or can be arranged in flat strips, as shown in FIG. 17. Upon application or deployment of hanger device 10, hooks 112A and 112B can be folded away from stem 108 to provide three-dimensional depth.

Figure 16C:
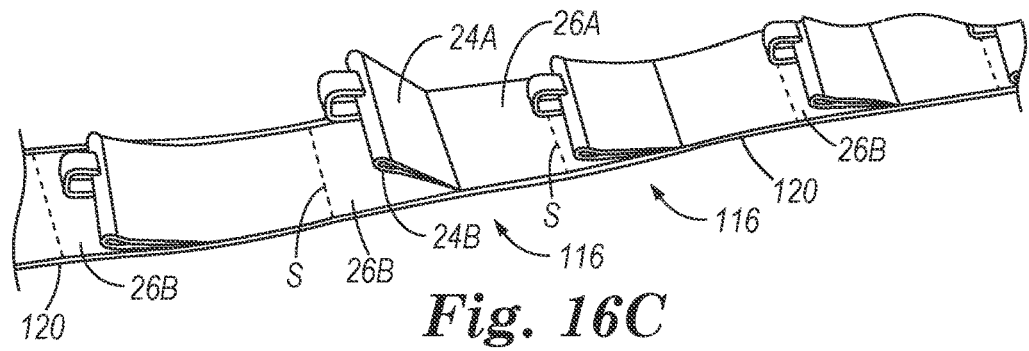
FIG. 16C is a top view of a string of folding flap hanger devices unwound from the spool of FIG. 16A having perforations in the backing between hanger devices.

FIG. 16A is a side view of roll 114 of folding flap hanger devices 116 wound around spool 118. FIG. 16B is a top view of a string of folding flap hanger devices 116 unwound from spool 118 of FIG. 16A. As can be seen in FIG. 16B, folding flap hanger devices 116 are attached to protective sheet 120. Any of the folding flap hanger devices 10 described herein can comprise folding flap hanger devices 116 and are, as such, numbered accordingly. Folding flap hanger devices 116 can be attached to protective sheets 120 in a ready-to-use state. For example, folding flap hanger devices 116 can be pre-folded such that panels 24A and 24B are already adhered to each other via adhesive layer 34. Adhesive layer 34 on panels 26A and 26B can be attached to protective sheet 120 in an end-to-end fashion such that edges 121A and 121B are spaced from each other. Protective sheet 120 can be wound around spool 118 with central flap members 12 laying down in contact with panels 26B. In FIG. 16C, panels 26A and 26B of adjacent hanger devices 116 are contiguous with each other at perforations or slits S so as to form a single strip. Alternatively to winding long lengths of protective sheet 120 and large numbers of folding flap hanger devices 116 around spool 118 for distributing and selling in large quantities, short lengths of protective sheet 120 and small numbers of folding flap hanger devices 116 can be provided as strips for distributing and selling in small quantities.

FIG. 17 is a top view of strip 122 of folding flap hanger devices 124 joined to dispenser panel 126. Folding flap hanger devices 124 are similar to hanger device 10 of FIG. 15 and are numbered accordingly. Folding flap hanger devices 124, however, include the addition of tabs 128A and 128B, which function similarly to tabs 46A and 46B of FIG. 8B. Stem 108 is disposed between adjacent panels 24A and 24B. Hooks 112A and 112B are coplanar with crossbar 110 and stem 108. Panels 26A and 26B are folded against each other with protective sheets 36A and 36B being disposed therebetween to prevent adhesive layer 34 from sticking to itself.

Dispenser panel 126 is connected to crossbar 110 via a small break-apart runners 130. As such, dispenser tab 126 is fabricated from the same material as hook elements 106. Thus, for example, one of folding flap hanger devices 124 can be twisted relative to dispenser panel 126 to provide separation therefrom.

Tabs 132 are disposed between adjacent pairs of panels 26A and 26B. Thus, each tab 132 comprises two layers backing material, two layers of adhesive layer and two layers of protective sheets. Tabs 132 are connected to panels 26A and 26B via small runners that can be easily broken apart by a consumer to remove one of folding flap hanger devices 124 from strip 122.

Strip 122 provides a flat assembly when folding flap hanger devices 124 are connected thereto, but the construction of strip 122 allows for hooks 112A and 112B to be folded into a desired configuration and allows for panels 26A and 26B to be folded away from each other to allow adhesion to a surface after the protective sheets are removed.

NOTES & EXAMPLES

Example 1 can include or use subject matter such as a flexible hook hanger comprising: an elongate sheet of pliable backing comprising: a first end, a second end, a first zone positioned adjacent the first end, a second zone positioned adjacent the second end, and a central zone positioned between the first and second zones; an adhesive layer disposed on one side of the sheet of pliable backing; and a hook element connected to the central zone; wherein the pliable backing comprises microstructured tape; and wherein the adhesive layer comprises a pressure sensitive adhesive having one or more hydrocarbon block copolymers, and a polar phenolic tackifier.

Example 2 can include, or can optionally be combined with the subject matter of Example 1, to optionally include panels of the elongate sheet of pliable backing that are folded such that the central zone is folded in against itself to form a central flap and the first and second zones are folded out from the central flap to form adhesion panels.

Example 3 can include, or can optionally be combined with the subject matter of one or any combination of Examples 1 or 2 to optionally include an elongate sheet of pliable backing that is folded to provide at least two peel fronts when the flexible hook hanger is adhered to a surface with the adhesive layer.

Example 4 can include, or can optionally be combined with the subject matter of one or any combination of Examples 1-3 to optionally include a third peel front that is provided between adjacent panels of the central zone.

Example 5 can include, or can optionally be combined with the subject matter of one or any combination of Examples 1-4 to optionally include a central flap that includes a weld between adjacent panels of the central zone.

Example 6 can include, or can optionally be combined with the subject matter of one or any combination of Examples 1-5 to optionally include first and second zones that are provided with at least one protective sheet.

Example 7 can include, or can optionally be combined with the subject matter of one or any combination of Examples 1-6 to optionally include an elongate sheet of pliable backing that is wound around a spool.

Example 8 can include, or can optionally be combined with the subject matter of one or any combination of Examples 1-7 to optionally include each of the first and second zones being provided with a protective sheet.

Example 9 can include, or can optionally be combined with the subject matter of one or any combination of Examples 1-8 to optionally include a central flap that includes a distal crease forming a loop for receiving a hook element.

Example 10 can include, or can optionally be combined with the subject matter of one or any combination of Examples 1-9 to optionally include a hook element that comprises a buckle structure comprising: a bar located within the loop; a pad connected to the bar; and a hook extending from the tab.

Example 11 can include, or can optionally be combined with the subject matter of one or any combination of Examples 1-9 to optionally include a distal crease that includes an opening through which a portion of the hook element extends.

Example 12 can include, or can optionally be combined with the subject matter of one or any combination of Examples 1-9 and 11 to optionally include a hook element that comprises a bent rod comprising: first and second side extensions disposed in the loop; and a central eminence connected to the first and second side extensions, the central eminence extending through the opening.

Example 13 can include, or can optionally be combined with the subject matter of one or any combination of Examples 1-9 and 11 to optionally include a hook element that comprises a padded hook comprising: a planar base pad disposed between panels of the central zone within the central flap; and a hook extending from the planar pad through the opening.

Example 14 can include, or can optionally be combined with the subject matter of one or any combination of Examples 1-13 to optionally include a central zone that is split to receive a planar hook element between panels of the pliable backing.

Example 15 can include, or can optionally be combined with the subject matter of one or any combination of Examples 1-14 to optionally include a hook that extends away from a first side of the central zone and a second side of the central zone is configured to abut the second zone.

Example 16 can include, or can optionally be combined with the subject matter of one or any combination of Examples 1-15 to optionally include a second zone that is shorter in length than the first zone relative to a longitudinal axis of the elongate sheet of pliable backing.

Example 17 can include, or can optionally be combined with the subject matter of one or any combination of Examples 1-16 to optionally include a second side of the central zone that includes a window such that the adhesive layer is operable to adhere to the second zone.

Example 18 can include, or can optionally be combined with the subject matter of one or any combination of Examples 1-17 to optionally include a second side of the central zone that includes pre-induced stress relative to the first side of the central zone to induce the central flap to bias toward the second zone.

Example 19 can include, or can optionally be combined with the subject matter of one or any combination of Examples 1-18 to optionally include adhesion panels that are stiffer than the central flap.

Example 20 can include, or can optionally be combined with the subject matter of one or any combination of Examples 1-19 to optionally include a first zone and a second zone that include side flaps extending transverse to a longitudinal axis of the elongate sheet of pliable backing.

Example 21 can include, or can optionally be combined with the subject matter of one or any combination of Examples 1-20 to optionally include each side flap including a longitudinally extending tab configured to mate with an oppositely disposed tab to form a pair of upstanding tabs.

Example 22 can include, or can optionally be combined with the subject matter of one or any combination of Examples 1-20 to optionally include side flaps of the first zone that include longitudinally extending tabs configured to overlap with side flaps of the second zone.

Example 23 can include, or can optionally be combined with the subject matter of one or any combination of Examples 1-19 to optionally include a first zone that includes a pair of oppositely extending side flaps, and each side flap includes a longitudinally extending tab.

Example 24 can include, or can optionally be combined with the subject matter of one or any combination of Examples 1-23 to optionally include an adhesive layer that covers all of the first zone and central zone, but less than all of the second zone to form a pull tab.

Example 25 can include or use subject matter such as a flexible hook hanger comprising: an elongate sheet of pliable backing comprising: a first end, a second end, a first zone positioned adjacent the first end, a second zone positioned adjacent the second end, and a central zone positioned between the first and second zones; an adhesive layer disposed on one side of the sheet of pliable backing; and a hook element connected to the central zone; wherein at least one of the first zone and the second zone includes a peel arrestor.

Example 26 can include, or can optionally be combined with the subject matter of Example 25, to optionally include a peel arrestor comprising: side flaps extending from the first zone and the second zone transverse to a longitudinal axis of the elongate sheet of pliable backing.

Example 27 can include, or can optionally be combined with the subject matter of one or any combination of Examples 25 or 26 to optionally include each side flap including a longitudinally extending tab configured to mate with an oppositely disposed tab to form a pair of upstanding tabs.

Example 28 can include, or can optionally be combined with the subject matter of Example 26 to optionally include side flaps of the first zone including longitudinally extending tabs configured to overlap with side flaps of the second zone.

Example 29 can include, or can optionally be combined with the subject matter of Example 25 to optionally include a peel arrestor comprising: a pair of oppositely extending side flaps connected to the first zone; and a longitudinally extending tab connected to each side flap.

Example 30 can include, or can optionally be combined with the subject matter of one or any combination of Examples 25-29 to optionally include a peel arrestor comprising an opening in the central zone through which a portion of the adhesive layer is exposed.

Example 31 can include or use subject matter such as a flexible hook hanger comprising: an elongate sheet of pliable backing comprising: a first end, a second end, a first zone positioned adjacent the first end, a second zone positioned adjacent the second end, and a central zone positioned between the first and second zones; an adhesive layer disposed on one side of the sheet of pliable backing; and a hook element connected to the central zone; wherein the first zone and the second zone have a first width and a second width, respectively; and wherein the central zone has a third width that is less than at least one of the first width and the second width.

Example 32 can include or use subject matter such as a flexible hook hanger comprising: an sheet of pliable backing forming and elongate strip and a peel arrestor; an adhesive layer applied to one side of the sheet of pliable backing; and a hook element; wherein the elongate strip of the pliable backing is folded to form: a central flap to which the hook element is connected; and two adhesion zones forming at least two peel fronts for the adhesive layer on opposite sides of the central flap, the peel arrestor extending from at least one of the adhesion zones.

Example 33 can include, or can optionally be combined with the subject matter of Example 32, to optionally include a third peel front that is formed between portions of the sheet of pliable backing forming the central flap.

Example 34 can include, or can optionally be combined with the subject matter of one or any combination of Examples 32 or 33 to optionally include a third peel front that is welded.

Example 35 can include, or can optionally be combined with the subject matter of one or any combination of Examples 32-34 to optionally include a peel arrestor comprising a transverse side flap.

Example 36 can include, or can optionally be combined with the subject matter of one or any combination of Examples 32-35 to optionally include a peel arrestor further comprising a longitudinal tab extending from the transverse side flap.

Each of these non-limiting examples can stand on its own, or can be combined in various permutations or combinations with one or more of the other examples.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A flexible hook hanger comprising:
   an elongate sheet of pliable backing comprising:
     a first end;
     a second end;
     a first zone positioned adjacent the first end;
     a second zone positioned adjacent the second end; and
     a central zone positioned between the first and second zones;
   an adhesive layer disposed on a first side of the sheet of pliable backing; and a hook element connected to the central zone;

wherein the pliable backing comprises microstructured tape;

wherein the adhesive layer comprises a pressure sensitive adhesive having one or more hydrocarbon block copolymers, and a polar phenolic tackifier;

wherein the elongate sheet includes a peel arrestor, wherein the peel arrestor comprises side flaps extending from the first zone and the second zone transverse to a longitudinal axis of the elongate sheet of pliable backing; and wherein each side flap includes a longitudinally extending tab configured to mate with an oppositely disposed tab to form a pair of upstanding tabs.

2. The flexible hook hanger of claim 1, wherein panels of the elongate sheet of pliable backing are folded such that the central zone is folded in against itself to form a central flap and the first and second zones are folded out from the central flap to form adhesion panels.

3. The flexible hook hanger of claim 2, wherein the elongate sheet of pliable backing is folded to provide at least two peel fronts when the flexible hook hanger is adhered to a surface with the adhesive layer.

4. The flexible hook hanger of claim 3, wherein a third peel front is provided between adjacent panels of the central zone.

5. The flexible hook hanger of claim 2, wherein the central flap includes a distal crease forming a loop for receiving a hook element.

6. The flexible hook hanger of claim 5, wherein the hook element comprises a buckle structure comprising:

a bar located within the loop;
a pad connected to the bar; and
a hook extending from the tab.

7. The flexible hook hanger of claim 5, wherein the distal crease includes an opening through which a portion of the hook element extends.

8. The flexible hook hanger of claim 2, wherein the central zone is split to receive a planar hook element between panels of the pliable backing.

9. The flexible hook hanger of claim 8, wherein one side of the central zone includes a window such that the adhesive layer is operable to adhere to the second zone.

10. The flexible hook hanger of claim 8, wherein one side of the central zone includes pre-induced stress relative to an opposing side of the central zone to induce the central flap to bias toward the second zone.

11. The flexible hook hanger of claim 1, wherein the upstanding tabs are generally perpendicular to the pliable backing in the first zone.

12. A flexible hook hanger comprising:

an elongate sheet of pliable backing comprising:
    a first end;
    a second end;
    a first zone positioned adjacent the first end;
    a second zone positioned adjacent the second end; and
    a central zone positioned between the first and second zones;

an adhesive layer disposed on one side of the sheet of pliable backing; and a hook element connected to the central zone;

wherein the elongate sheet includes a peel arrestor comprising at least one of:

side flaps extending from the first zone and the second zone transverse to a longitudinal axis of the elongate sheet of pliable backing; and an opening in the central zone through which a portion of the adhesive layer is exposed, wherein each side flap extending from the first zone includes a longitudinally extending tab configured to mate with opposing side flaps extending from the second zone.

13. The flexible hook hanger of claim 12, wherein the peel arrestor comprises the side flaps.

14. The flexible hook hanger of claim 13, wherein the peel arrestor further includes the opening in the central zone.

15. The flexible hook hanger of claim 12, wherein each side flap extending from the second zone includes a longitudinally extending tab configured to mate with an oppositely disposed tab extending from the first zone to form a pair of upstanding tabs, and wherein the upstanding tabs are generally perpendicular to the pliable backing in the first zone.

16. The flexible hook hanger of claim 12, wherein the elongate sheet includes panels, and wherein the panels are folded such that the central zone is folded in against itself to form a central flap and the first and second zones are folded out from the central flap to form adhesion panels.

17. The flexible hook hanger of claim 16, wherein the elongate sheet of pliable backing is folded to provide at least two peel fronts when the flexible hook hanger is adhered to a surface with the adhesive layer.

* * * * *